US 8,665,167 B2

(12) United States Patent  
Orihara

(10) Patent No.: US 8,665,167 B2  
(45) Date of Patent: Mar. 4, 2014

(54) ANTENNA CIRCUIT, METHOD FOR REDUCING RESISTANCE OF ANTENNA CIRCUIT, AND TRANSPONDER

(75) Inventor: Katsuhisa Orihara, Kanuma (JP)

(73) Assignee: Dexerials Corporation, Tokyo (JP)

( * ) Notice: Subject to any disclaimer, the term of this patent is extended or adjusted under 35 U.S.C. 154(b) by 400 days.

(21) Appl. No.: 12/738,497

(22) PCT Filed: Oct. 15, 2008

(86) PCT No.: PCT/JP2008/068618
§ 371 (c)(1),
(2), (4) Date: Jul. 19, 2010

(87) PCT Pub. No.: WO2009/054289
PCT Pub. Date: Apr. 30, 2009

(65) Prior Publication Data
US 2010/0283698 A1    Nov. 11, 2010

(30) Foreign Application Priority Data

Oct. 24, 2007 (JP) .................. 2007-277031

(51) Int. Cl.
*H01Q 7/08* (2006.01)
(52) U.S. Cl.
USPC ............................ 343/788; 343/867; 343/866
(58) Field of Classification Search
USPC .......................................... 343/788, 867, 866
See application file for complete search history.

(56) References Cited

U.S. PATENT DOCUMENTS

| | | | |
|---|---|---|---|
| 5,436,441 A | 7/1995 | Inoue | |
| 5,608,417 A * | 3/1997 | de Vall | 343/895 |
| 5,999,409 A | 12/1999 | Ando et al. | |
| 6,018,298 A * | 1/2000 | Endo et al. | 340/572.5 |
| 6,373,708 B1 | 4/2002 | Ando et al. | |
| 6,600,404 B1 | 7/2003 | Kajino | |
| 6,924,777 B2 * | 8/2005 | Reasoner et al. | 343/866 |
| 2006/0028384 A1 * | 2/2006 | Akiho et al. | 343/742 |
| 2006/0237544 A1 * | 10/2006 | Matsuura et al. | 235/492 |
| 2007/0040751 A1 * | 2/2007 | Boyle | 343/702 |
| 2007/0205945 A1 * | 9/2007 | Tatarnikov et al. | 343/7 MS |
| 2007/0216590 A1 * | 9/2007 | Montgomery et al. | 343/745 |
| 2009/0201116 A1 * | 8/2009 | Orihara | 336/200 |

FOREIGN PATENT DOCUMENTS

| | | |
|---|---|---|
| JP | 05-128324 | 5/1993 |
| JP | 10-203066 | 8/1998 |
| JP | 11-066260 | 3/1999 |
| JP | 11-204337 | 7/1999 |
| JP | 2006-13976 | 1/2006 |
| JP | 2006-352750 | 12/2006 |
| JP | 2007-074334 | 3/2007 |
| WO | WO 2007138770 A1 * 12/2007 | H01Q 1/22 |

OTHER PUBLICATIONS

International Search Report dated Nov. 13, 2008, for corresponding Patent Application PCT/JP2008/068618.

* cited by examiner

*Primary Examiner* — Jerome Jackson, Jr.
*Assistant Examiner* — Collin Dawkins
(74) *Attorney, Agent, or Firm* — K&L Gates LLP

(57) ABSTRACT

A method for reducing a resistance of an antenna circuit capable of obtaining a desired property by reducing wiring resistance to a suitable value while ensuring inductance is provided. An antenna circuit is disposed to a transponder having a carrier frequency band of 13.56 MHz. The antenna circuit is formed of a prescribed base material and two antenna conductors each of which is formed of the same conductor pattern forming an antenna coil, formed on respective front and back surfaces of the base material by electrically parallel connection. Each of the two antenna conductors has a thickness of greater than equal to 5% and less than 50% of an overall thickness formed of the two antenna conductors and the base material.

19 Claims, 20 Drawing Sheets

ANTENNA CIRCUIT, METHOD FOR REDUCING RESISTANCE OF ANTENNA CIRCUIT, AND TRANSPONDER

CROSS REFERENCE TO RELATED APPLICATIONS

The present application is a National Stage of International Application No. PCT/JP2008/068618 filed on Oct. 15, 2008 and which claims priority to Japanese Patent Application No. 2007-277031 filed on Oct. 24, 2007, the entire contents of which are being incorporated herein by reference.

BACKGROUND

The present disclosure relates to an antenna circuit including at least an antenna coil formed on a surface of a prescribed base material, to a method for reducing an electric resistance of the antenna circuit, and to a transponder including the antenna circuit.

A radio frequency identification (RFID) system, referred to as an individual management system, has received attention from various industries in recent years. The RFID system is a technology allowing wireless communications between a transponder and a prescribed reader/writer, thereby reading and/or writing data with respect to the transponder in a non-contact manner. The transponder is a non-contact type small integrated circuit (hereafter referred to as an IC) device not only storing various data in a readable and/or writable manner but also having a communication function. The RFID system is, for example, applied to production and distribution management by attaching the transponder as a tag or tags to a product or products. Moreover, attempts have been made to apply the RFID system to various usages such as transportation toll/fare collection, identification, and electronic monies.

The RFID system can allow a communication distance to be available from several millimeters to several meters, and can be broadly classified into a close-contact type, a proximity type, a vicinity type, and a remote type according to an increasing order of the communication distance. Moreover, the RFID system generally uses 125 kHz, 134 kHz, 4.9 MHz, 13.56 MHz, 2.45 GHz, and 5.8 GHz serving as carrier frequency bands. Among such carrier frequency bands, the short-wave band of 13.56 MHz is standardized as ISO (International Organization for Standardization) 14443 for the close-contact type and as ISO 15693 for the vicinity type, and tends to be widespread.

Moreover, the RFID system can be classified into two systems: an electromagnetic induction system and a radio wave system according to a data transmission method. The electromagnetic induction system allows the data to be transmitted on the magnetic flux generated from the reader/writer, and is mainly used for the short-wave band having the carrier frequency band up to approximately 13.56 MHz. The electromagnetic induction system has various advantages. For example, the electromagnetic induction system tends not to be influenced by rain or dust, thereby applicable in a bad environment. The electromagnetic induction system, for example, has wide antenna directivity, thereby covering a wide transmission range. The electromagnetic induction system also has the advantage of good permeability with respect to a non-electric conductor. The radio wave system, on the other hand, allows the data to be transmitted on the radio wave generated from the reader/writer, and is mainly used for a high carrier frequency band. The radio wave system has advantages, for example, longer communication distance compared to the electromagnetic induction system, the antenna directivity, and facilitation of defining the transmission range.

The transponder, operated using the electromagnetic induction system, includes a parallel resonant circuit to effectively convert the magnetic energy into the electrical voltage, so that the data and the voltage necessary for the operation are transferred. Accordingly, such as a transponder often includes the parallel resonant circuit having a loop antenna and a capacitor connected in parallel with respect to the loop antenna, so that the data and the voltage necessary for the operation are transferred. Basically, the transponder is structured as a circuit including an IC chip 103 connected to a resonance circuit having an antenna coil 101 and a tuning capacitor 102 disposed in parallel as illustrated in FIG. 38.

The RFID system has fundamental capabilities, such as the communication distance, which depend upon a trapping ratio (a coupling factor) of the magnetic flux generated from the reader/writer and a resonance impedance of the transponder or a Q value. Consequently, the transponder needs to be designed to reduce a wiring resistance while ensuring the inductance in the same size thereof.

Herein, a method for reducing the wiring resistance includes an expansion of width or thickness of a coil pattern forming the antenna coil in a case where the transponder has a single surface structure with the antenna coil formed on one surface of a base material. According to such a transponder, however, a specification of an external dimension has been decided, causing the limitation of changes in the pattern width or the pattern thickness. In a case where the pattern width is expanded while the size of the transponder remains the same, the number of turns of the antenna coil is decreased, causing reduction of the inductance.

The method for reducing the wiring resistance also includes formation of the antenna coil on both surfaces of the base material. In such a transponder, however, the floating capacitance of the antenna is changed due to misregistration of top and bottom patterns, causing a change in the resonance frequency.

For example, Patent Documents 1 through 3 disclose attempts made to reduce the wiring resistance by connecting the antenna coils formed on the both surfaces of the base material in parallel.

Patent Document 1: Japanese Unexamined Patent Application Publication No. H11-66260
Patent Document 2: Japanese Unexamined Patent Application Publication No. 2007-74334
Patent Document 3: Japanese Unexamined Patent Application Publication No. 2006-352750

According to the technology disclosed in Patent Documents 1 through 3, in a case where a plurality of antenna coils are connected in parallel, the wiring resistance thereof is theoretically considered to be a multiplicative inverse of the number of the antenna coils. In the transponder, however, the wiring resistance is not simply equal to the multiplicative inverse of the number of antenna coils, causing the possibility of an inadequate reduction of the wiring resistance.

Herein, the transponder has the antenna coil including the conductor applied with a high frequency current and influenced by a skin effect concentrating current density on a surface of the conductor. Moreover, in a case where the conductors include the surfaces provided face to face with each other, for example, in a case where the plural antenna coils are connected in parallel, the electric current tends not to be applied to the surfaces disposed face to face with each other due to a proximity effect. Accordingly, the inventor of the present invention has thought that the wiring resistance is not simply equal to the multiplicative inverse of the number of antenna coils due to the skin effect or the proximity effect.

Consequently, the transponder can reduce the wiring resistance while ensuring the inductance by connection of the plural antenna coils in parallel. However, a suitable design guide for the transponder has not been developed yet in consideration of the influence exerted by application of the high frequency current to the conductor. The development of the suitable design guide is needed to enhance a capability of the transponder having the limitation of flexibility due to the limitation of size.

SUMMARY

The present embodiments provide: an antenna circuit capable of obtaining a desired property by reduction of a wiring resistance to a suitable value while ensuring inductance thereof; a method for reducing a resistance of the antenna circuit; and a transponder including the antenna circuit.

Studies have focused attention on which the wiring resistance of the conductor applied with a high frequency current is dependent on a frequency by the skin effect while a current density applied to the conductor by the skin effect is dependent on a circumferential length of a cross section of the conductor, not depending on a cross-sectional area of the conductor, upon studying the current distribution and the like in the parallel connection of plural antenna coils. Accordingly, an increase in the circumferential length of the cross section of the antenna coil is desired to reduce the wiring resistance. Moreover, conductor thickness of the plural antenna coils and thickness of a base material sandwiched between the antenna coils can be regulated as a method for controlling the influence by the proximity effect, so that the wiring resistance can be reduced to a suitable value while ensuring the inductance in a prescribed frequency band.

According to an embodiment, a method for reducing a resistance of the antenna circuit reduces an electrical resistance of the antenna circuit to be disposed to a transponder, storing various data in a readable and/or writable manner and having a communication function, for a carrier frequency of 13.56 MHz. The antenna circuit includes: a prescribed base material; and two antenna conductors, each of which is formed of a same prescribed conductor pattern forming an antenna coil, formed on respective front and back surfaces of the base material by an electrically parallel connection. Each of the two antenna conductors has a thickness arranged to be greater than or equal to 5% and less than 50% of an overall thickness formed of the two antenna conductors and the base material.

According to the method for reducing the resistance of the antenna circuit of the embodiment, the thickness of each of the two antenna conductors is formed to be within a prescribed range with respect to an overall thickness including the thickness of the two antenna conductors connected in parallel and the base material, so that a resistance reduction effect becomes greater than that obtained in a case where the two antenna conductors are connected in parallel. Particularly, each of the two antenna conductors is formed to be between greater than or equal to 5% and less than 50% of the overall thickness including the thickness of the two antenna conductors and the base material, thereby reducing the wiring resistance to the suitable value while ensuring the inductance in the carrier frequency band of 13.56 MHz.

According to another embodiment, an antenna circuit is disposed to a transponder, storing various data in a readable and/or writable manner and having a communication function, for a carrier frequency of 13.56 MHz. The antenna circuit includes: a prescribed base material; and two antenna conductors, each of which is formed of a same prescribed conductor pattern forming an antenna coil, formed on respective front and back surfaces of the base material by an electrically parallel connection. Each of the two antenna conductors has a thickness of greater than or equal to 5% and less than 50% of an overall thickness formed of the two antenna conductors and the base material.

According to another embodiment, a transponder storing various data in a readable and/or writable manner and having a communication function for a carrier frequency of 13.56 MHz is provided. The transponder includes: an antenna circuit including at least an antenna coil formed on a surface of a prescribed base material; and an IC chip mounted on the antenna circuit. The antenna circuit includes two antenna conductors, each of which is formed of a same prescribed conductor pattern forming the antenna coil, formed on respective front and back surfaces of the base material by an electrically parallel connection. Each of the two antenna conductors has a thickness of greater than or equal to 5% and less than 50% of an overall thickness formed of the two antenna conductors and the base material.

According to the antenna circuit and the transponder of the embodiment, the resistance reduction effect can be greater than that obtained in a case where the two antenna conductors are connected in parallel.

The present embodiment can allow the resistance reduction effect to be greater than that obtained in a case where the two antenna conductors are connected in parallel, thereby not only reducing the wiring resistance to the suitable value while ensuring the inductance in the carrier frequency band of 13.53 MHz, but also obtaining the desired property.

Additional features and advantages are described herein, and will be apparent from, the following Detailed Description and the figures.

Figure 10:
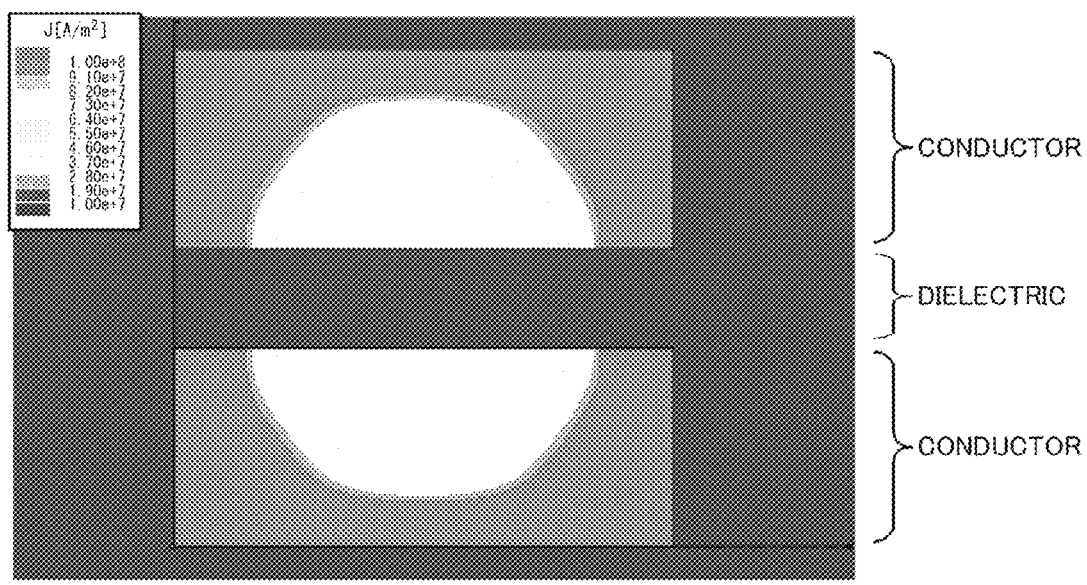
Figure 11:
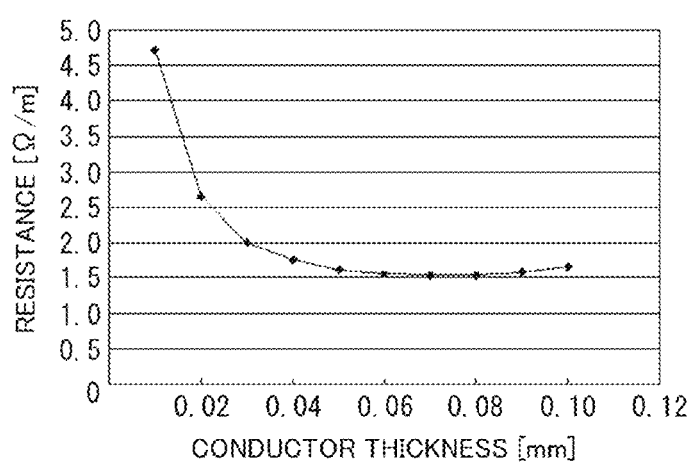
Figure 12:
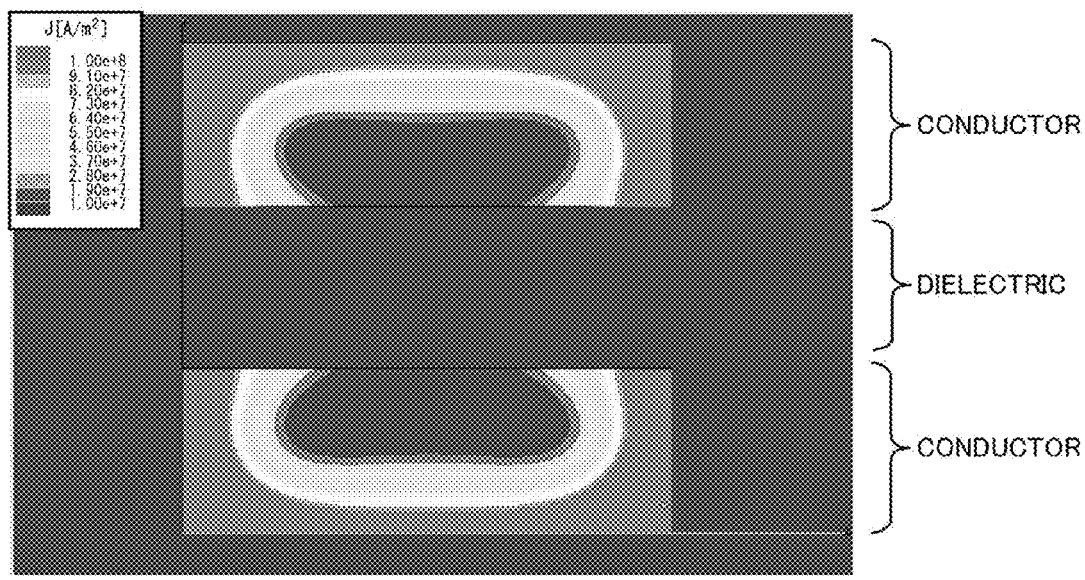
Figure 13:
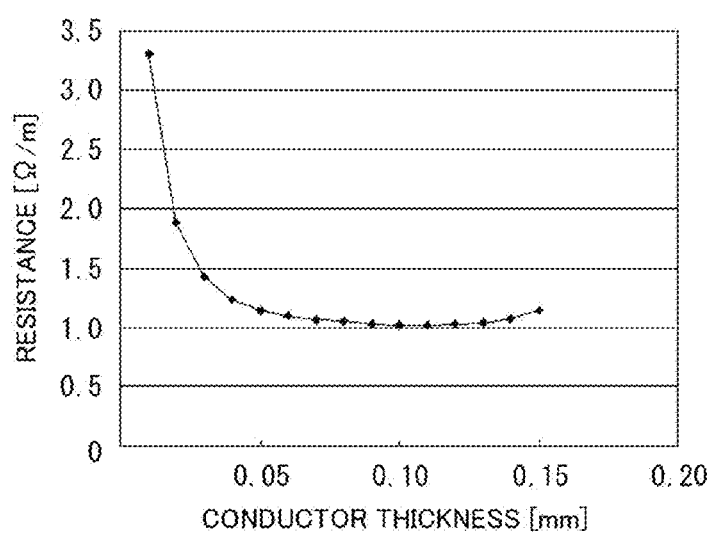
Figure 14:
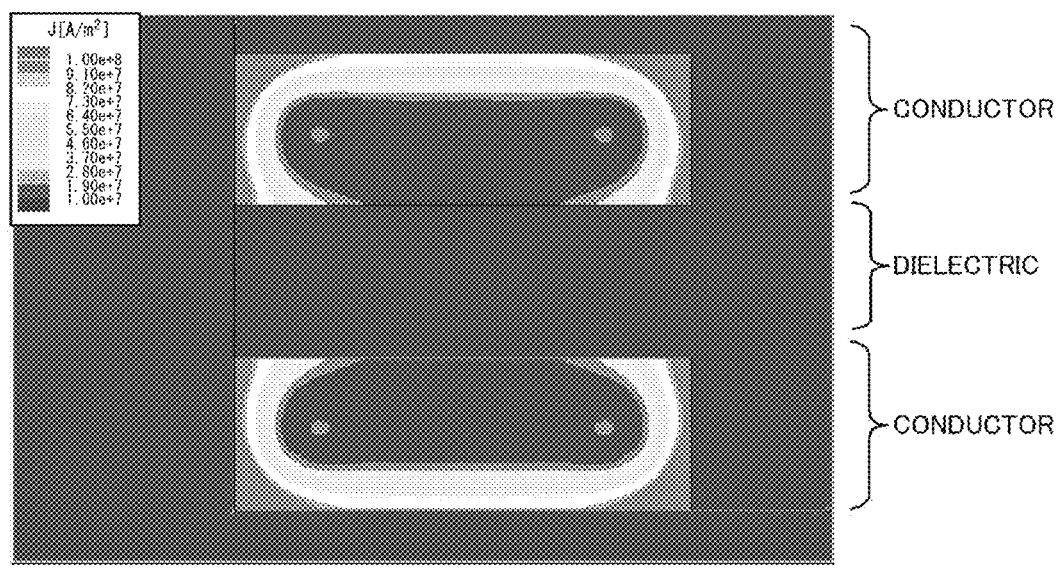
Figure 15:
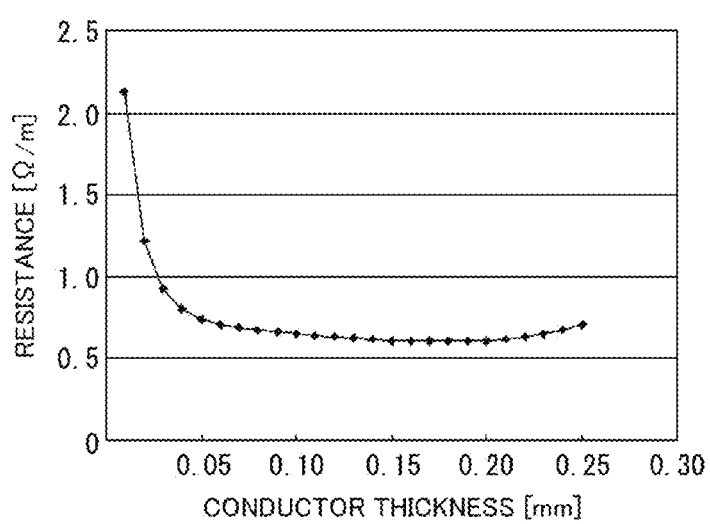
Figure 16:
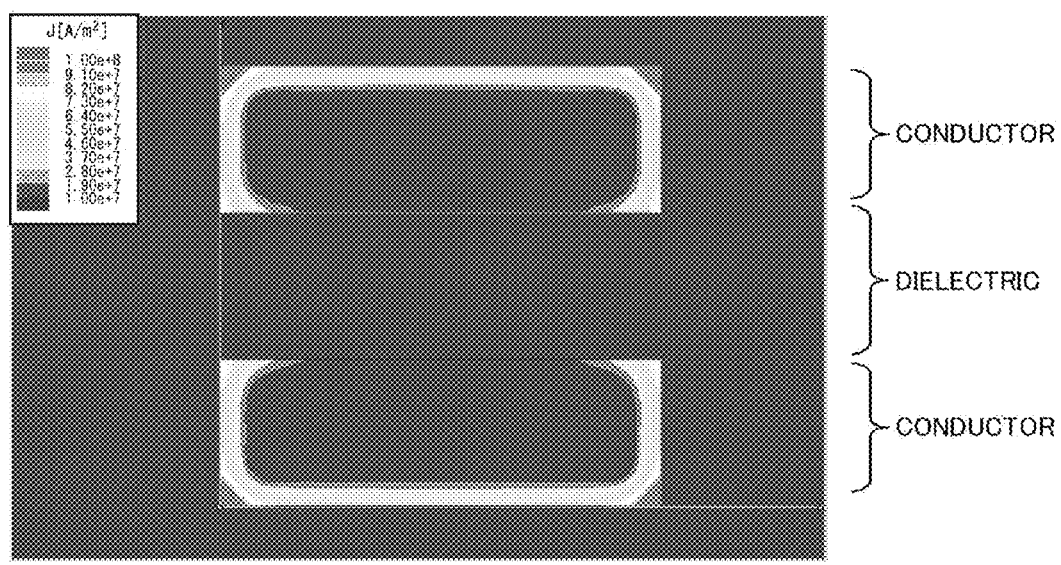
Figure 17:
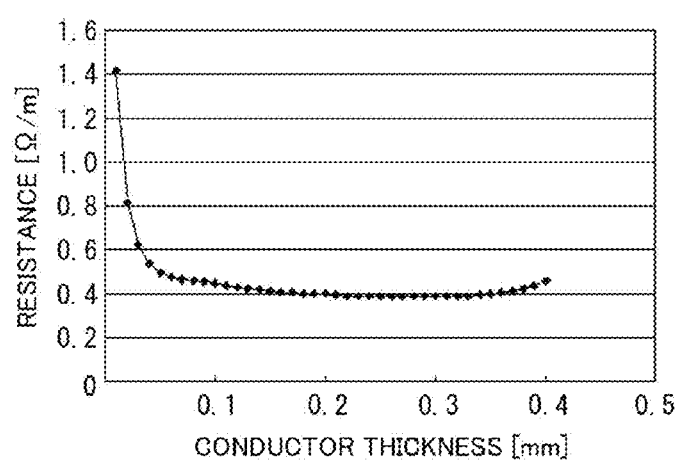
Figure 18:
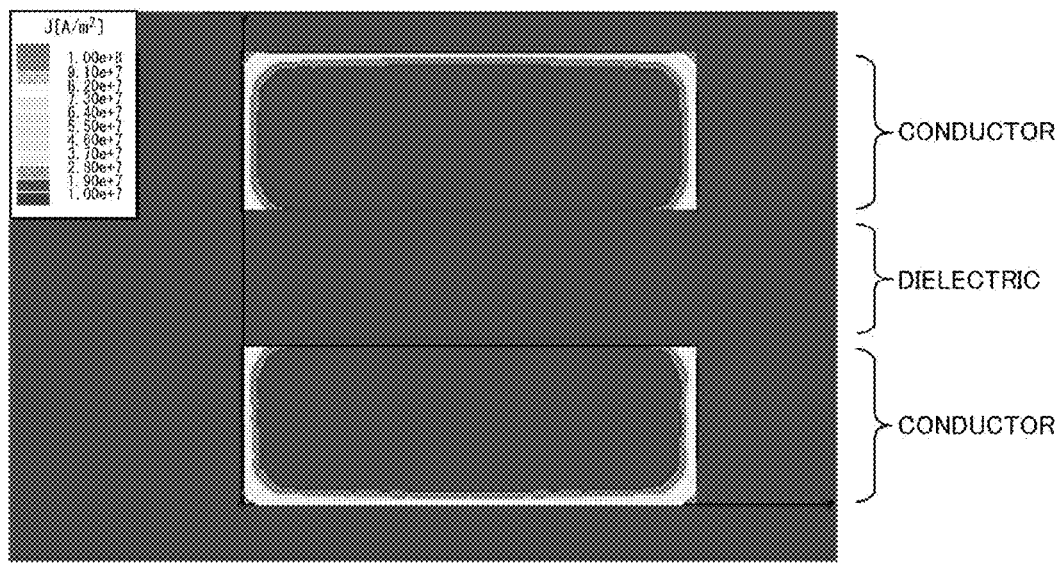
Figure 19:
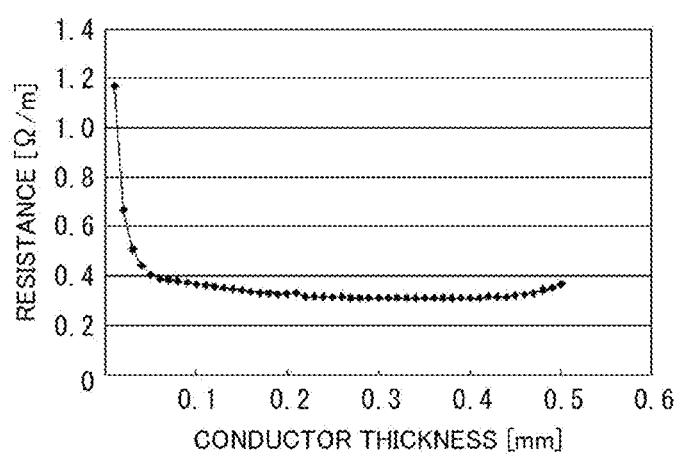
Figure 20:
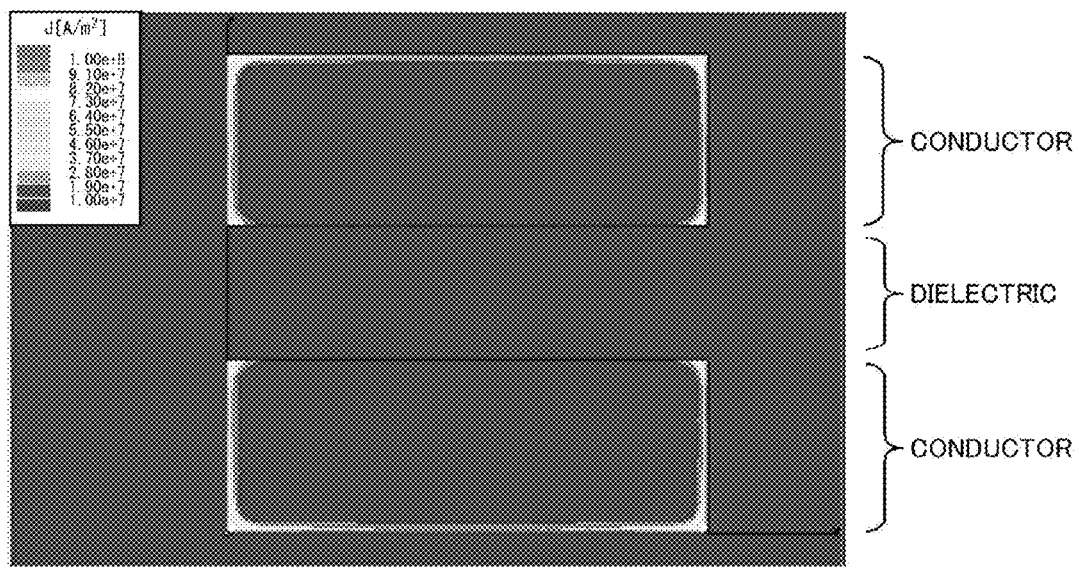
Figure 21:
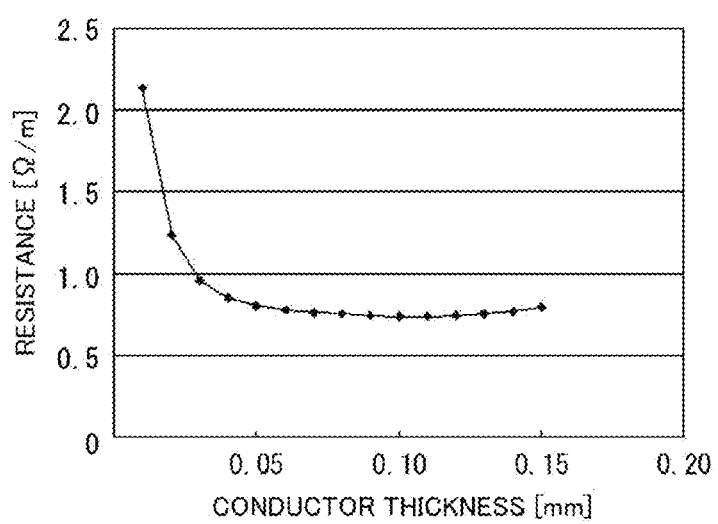
Figure 22:
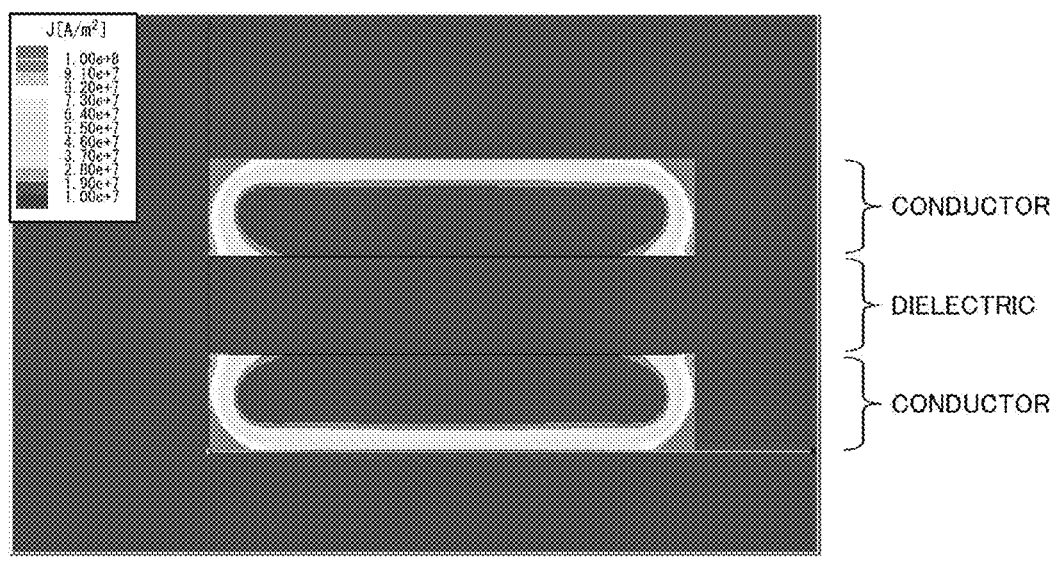
Figure 23:
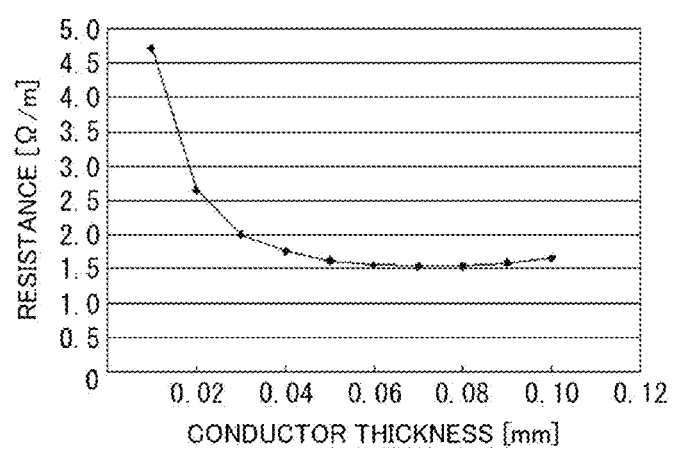
Figure 24:
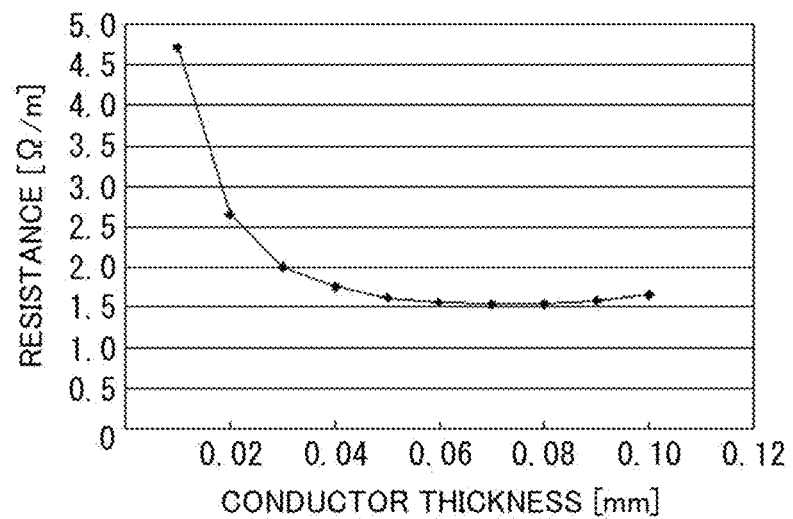
Figure 25:
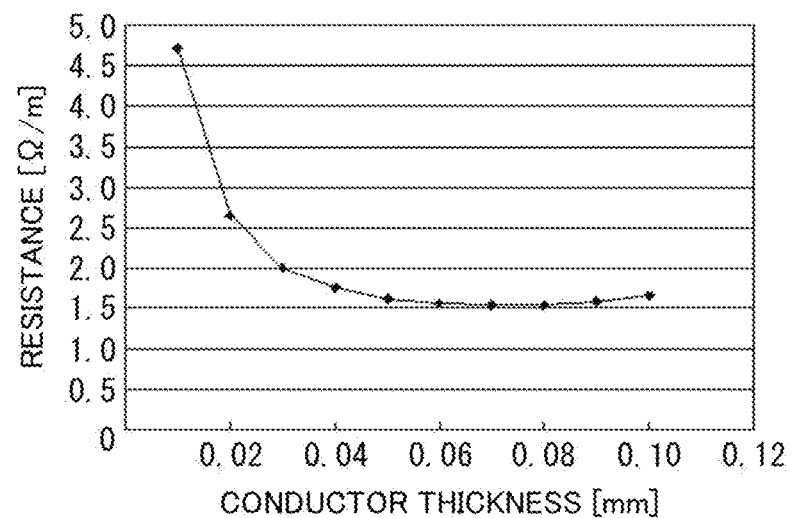
Figure 26:
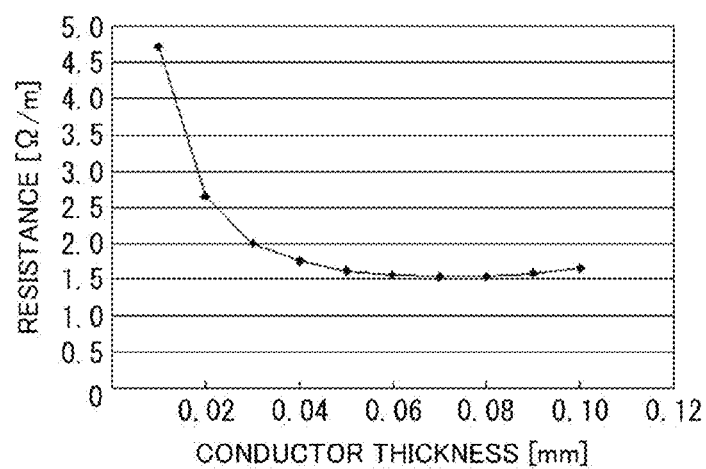
Figure 27:
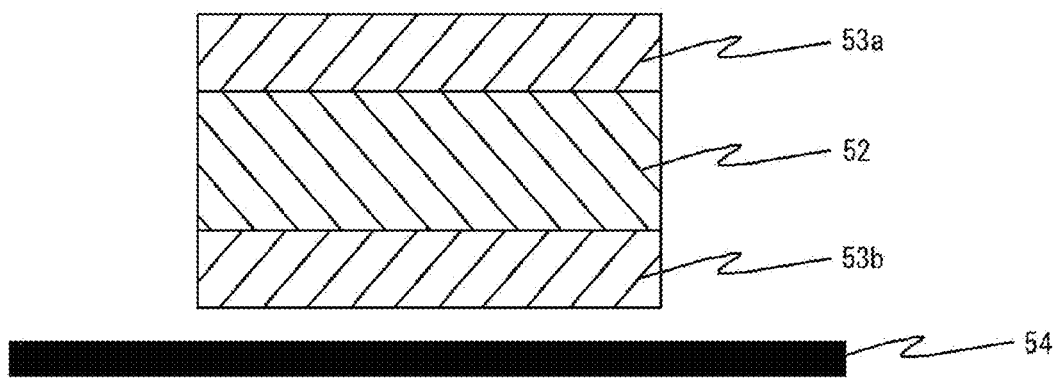
Figure 28:
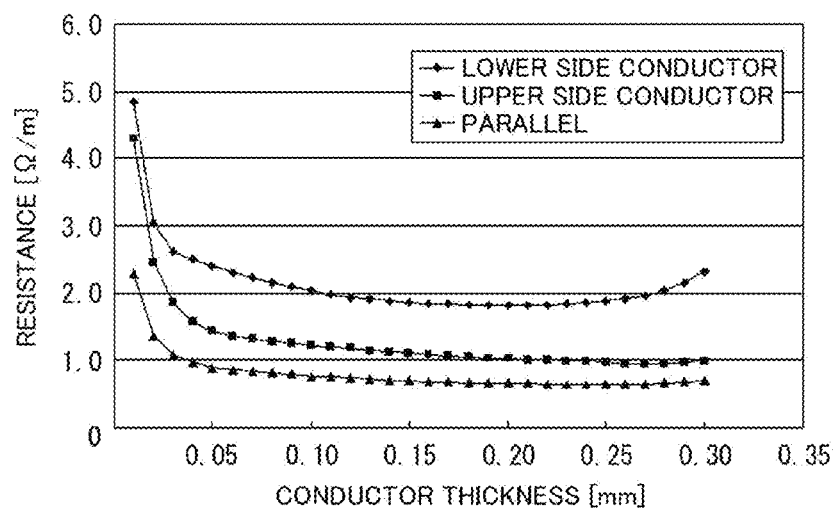
Figure 29:
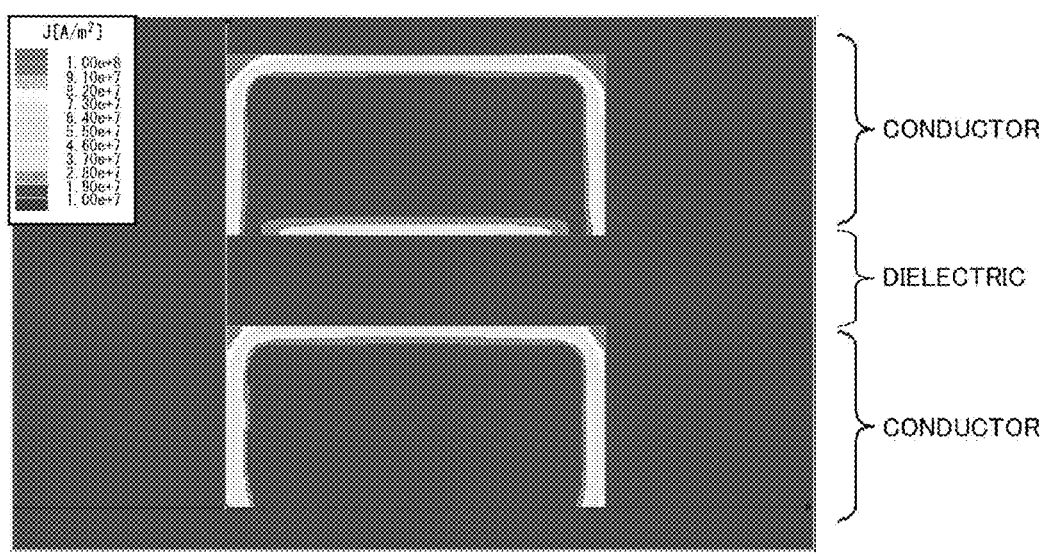
Figure 30:
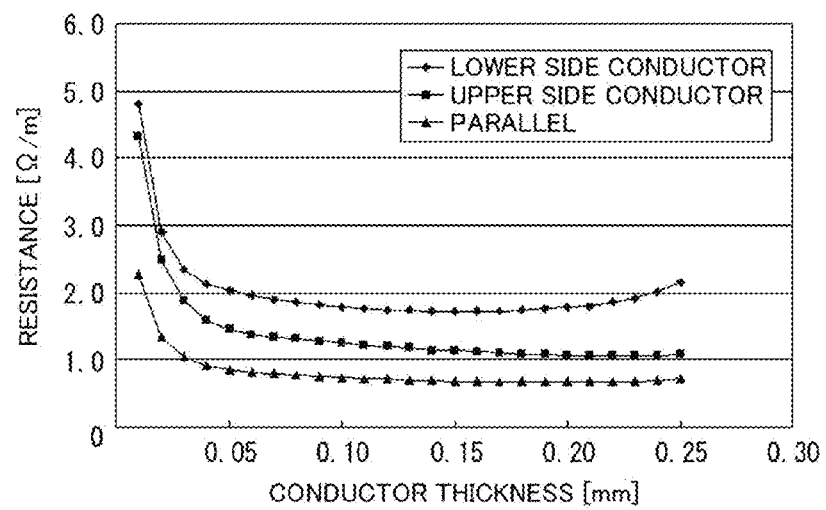
Figure 31:
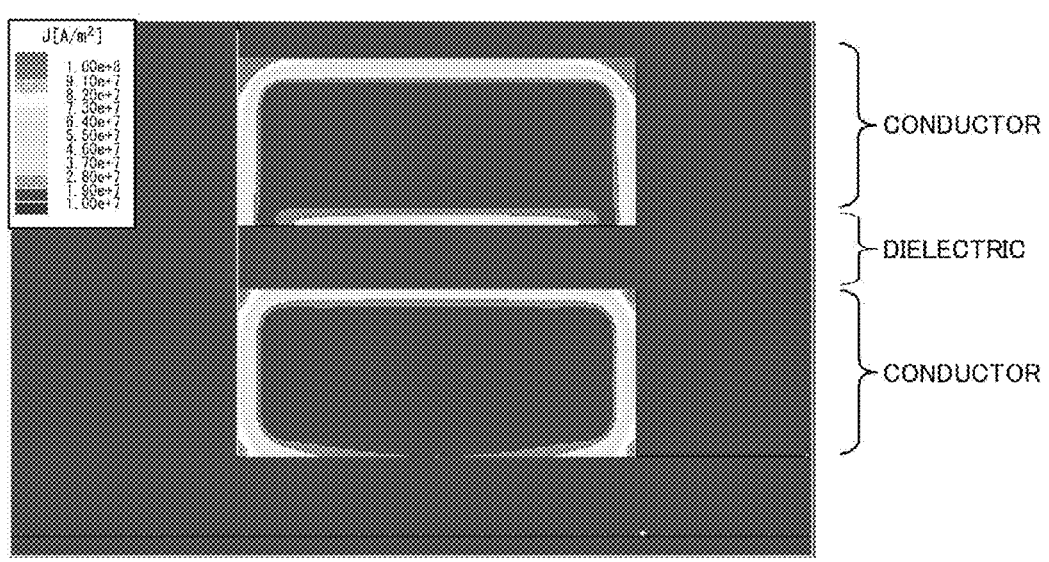
Figure 32:
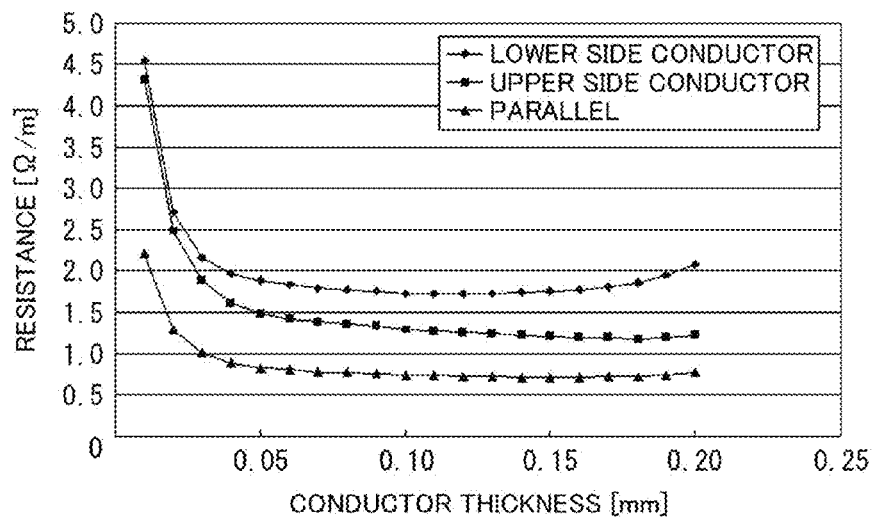
Figure 33:
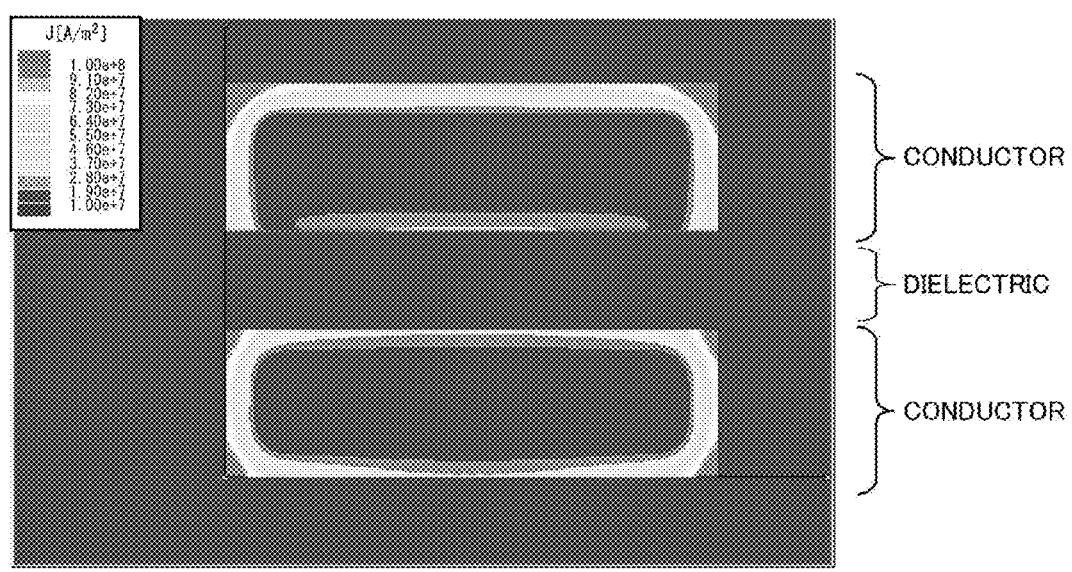
Figure 34:
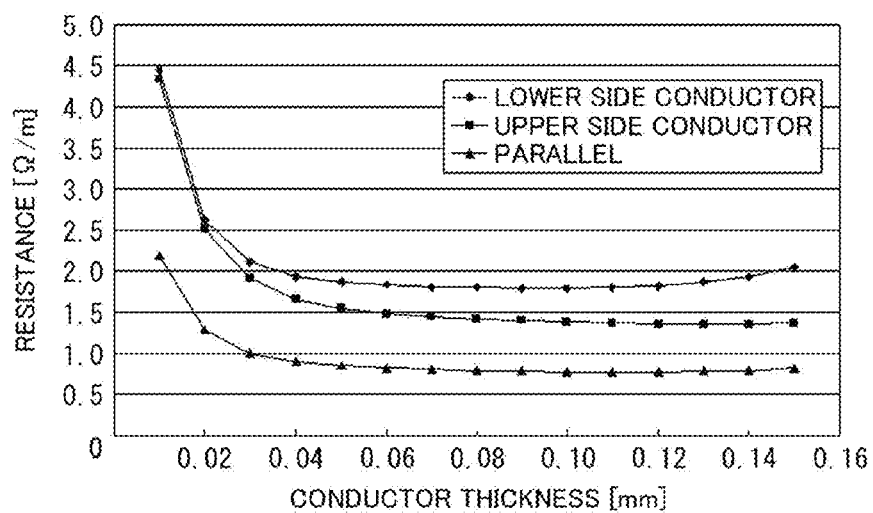
Figure 35:
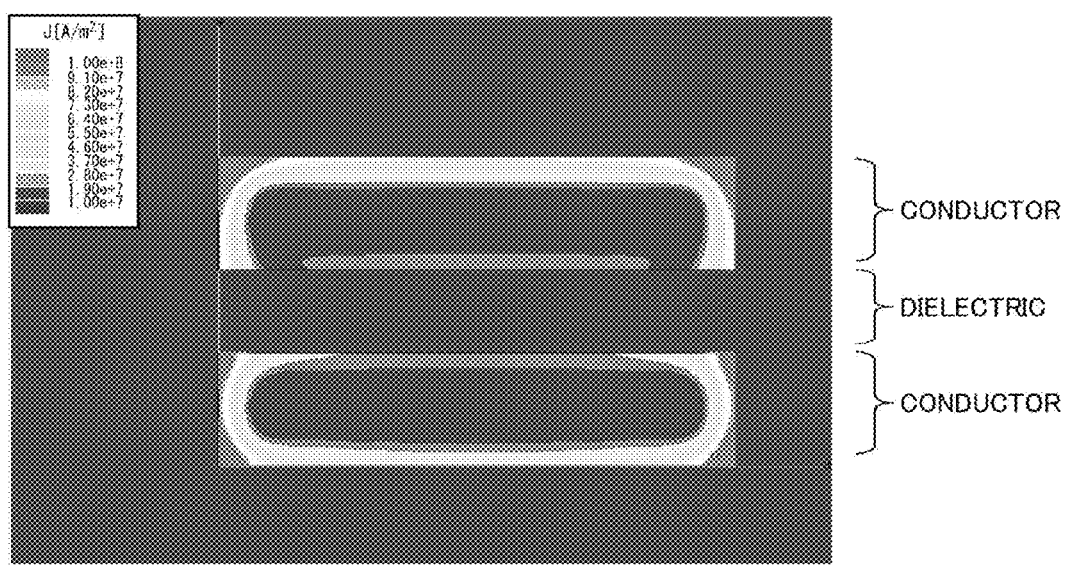
Figure 36:
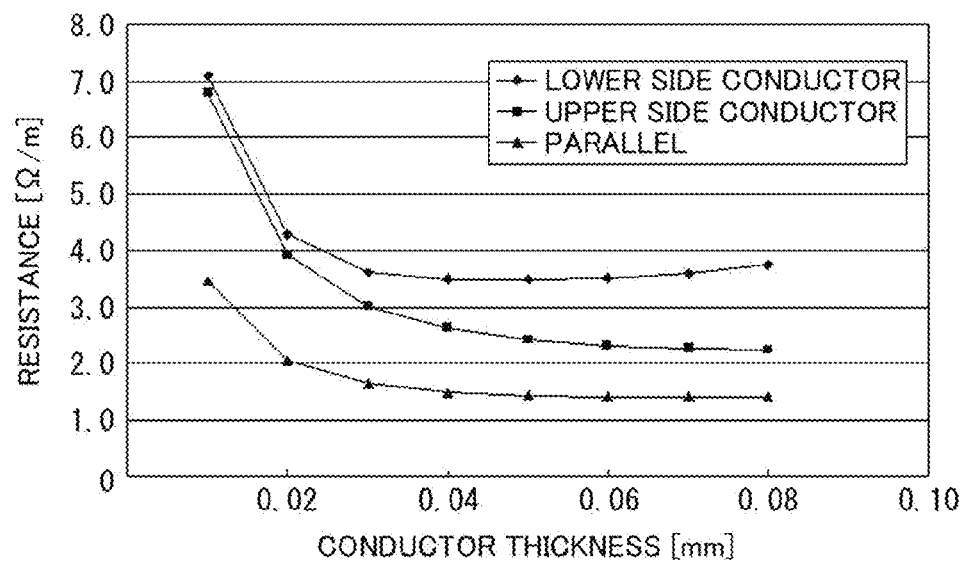
Figure 37:
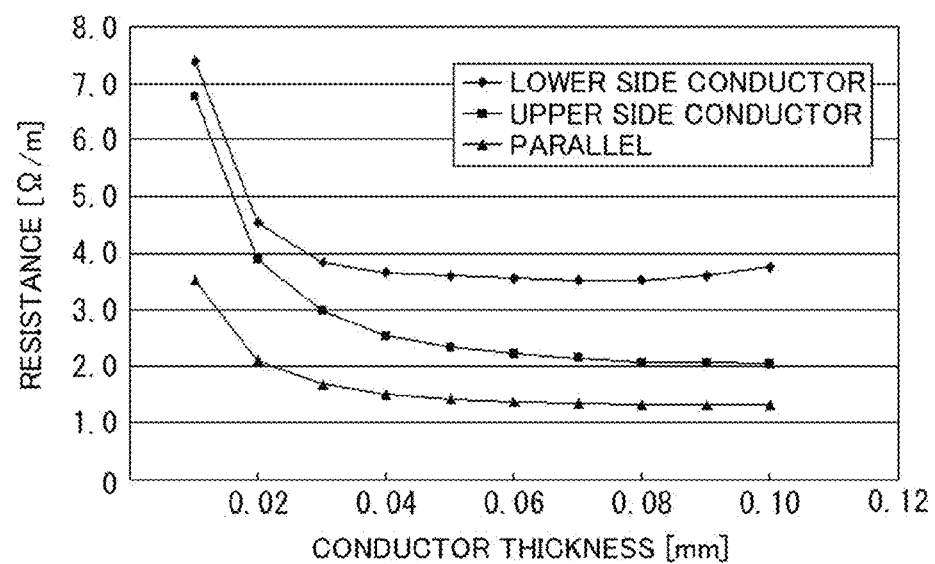
Figure 38:
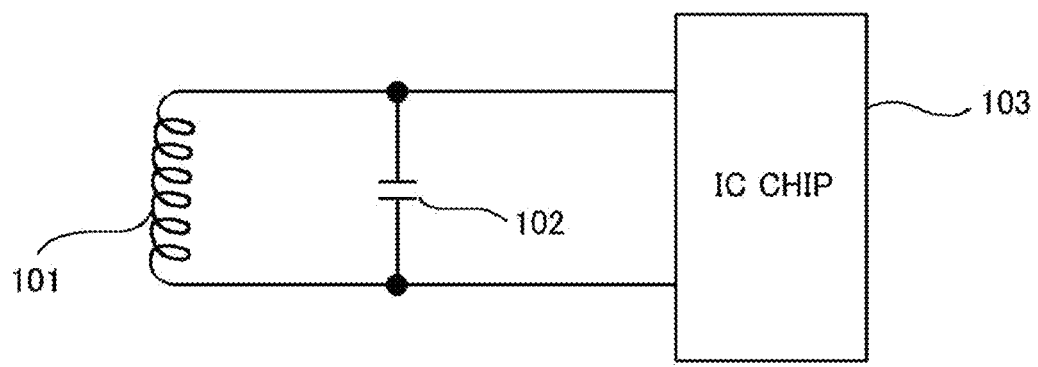

FIG. 10 is a schematic diagram illustrating a result of the simulation using the model having the width of 0.15 mm and the thickness of 0.15 mm and illustrating the current distribution where each of the conductors has a thickness of 0.06 mm;

FIG. 11 is a graph illustrating a result of the simulation using the model having a width of 0.2 mm and a thickness of 0.2 mm and illustrating a relationship between the conductor thickness and the resistance value;

FIG. 12 is a schematic diagram illustrating a result of the simulation using the model having the width of 0.2 mm and the thickness of 0.2 mm and illustrating the current distribution where each of the conductors has a thickness of 0.07 mm;

FIG. 13 is a graph illustrating a result of the simulation using the model having a width of 0.3 mm and a thickness of 0.3 mm and illustrating a relationship between the conductor thickness and the resistance value;

FIG. 14 is a schematic diagram illustrating a result of the simulation using the model having the width of 0.3 mm and the thickness of 0.3 mm and illustrating the current distribution where each of the conductors has a thickness of 0.11 mm;

FIG. 15 is a graph illustrating a result of the simulation using the model having a width of 0.5 mm and a thickness of 0.5 mm and illustrating a relationship between the conductor thickness and the resistance value;

FIG. 16 is a schematic diagram illustrating a result of the simulation using the model having the width of 0.5 mm and the thickness of 0.5 mm and illustrating the current distribution where each of the conductors has a thickness of 0.18 mm;

FIG. 17 is a graph illustrating a result of the simulation using the model having a width of 0.8 mm and a thickness of 0.8 mm and illustrating a relationship between the conductor thickness and the resistance value;

FIG. 18 is a schematic diagram illustrating a result of the simulation using the model having the width of 0.8 mm and the thickness of 0.8 mm and illustrating the current distribution where each of the conductors has a thickness of 0.28 mm;

FIG. 19 is a graph illustrating a result of the simulation using the model having a width of 1.0 mm and a thickness of 1.0 mm and illustrating a relationship between the conductor thickness and the resistance value;

FIG. 20 is a schematic diagram illustrating a result of the simulation using the model having the width of 1.0 mm and the thickness of 1.0 mm and illustrating the current distribution where each of the conductors has a thickness of 0.36 mm;

FIG. 21 is a graph illustrating a result of the simulation using the model having a width of 0.5 mm and a thickness of 0.3 mm and illustrating a relationship between the conductor thickness and the resistance value;

FIG. 22 is a schematic diagram illustrating a result of the simulation using the model having the width of 0.5 mm and the thickness of 0.3 mm and illustrating the current distribution where each of the conductors has a thickness of 0.11 mm;

FIG. 23 is a graph illustrating a result of a simulation using the model having the width of 0.2 mm and the thickness of 0.2 mm with a dielectric having a relative dielectric constant of 2, and illustrating a relationship between the conductor thickness and the resistance value;

FIG. 24 is a graph illustrating a result of the simulation using the model having the width of 0.2 mm and the thickness of 0.2 mm with the dielectric having a relative dielectric constant of 3, and illustrating a relationship between the conductor thickness and the resistance value;

FIG. 25 is a graph illustrating a result of the simulation using the model having the width of 0.2 mm and the thickness of 0.2 mm with the dielectric having a relative dielectric constant of 4, and illustrating a relationship between the conductor thickness and the resistance value;

FIG. 26 is a graph illustrating a result of the simulation using the model having the width of 0.2 mm and the thickness of 0.2 mm with the dielectric having a relative dielectric constant of 10, and illustrating a relationship between the conductor thickness and the resistance value;

FIG. 27 is a schematic diagram illustrating an antenna circuit model including a magnetic sheet used for a simulation;

FIG. 28 is a graph illustrating a result of the simulation using a model having a width of 0.5 mm and a thickness of 0.6 mm with the magnetic sheet disposed thereto without space under a lower side conductor, and illustrating a relationship between the conductor thickness and the resistance value;

FIG. 29 is a schematic diagram illustrating a result of the simulation using the model having a width of 0.5 mm and a thickness of 0.6 mm with the magnetic sheet disposed thereto without space under the lower side conductor, and illustrating current distribution where each of the conductors has a thickness of 0.26 mm;

FIG. 30 is a graph illustrating a result of the simulation using the model having a width of 0.5 mm and a thickness of 0.5 mm with the magnetic sheet disposed thereto with a space of 0.1 mm under a lower side conductor, and illustrating a relationship between the conductor thickness and the resistance value;

FIG. 31 is a schematic diagram illustrating a result of the simulation using the model having a width of 0.5 mm and a thickness of 0.5 mm with the magnetic sheet disposed thereto with a space of 0.1 mm under the lower side conductor, and illustrating the current distribution where each of the conductors has a thickness of 0.21 mm;

FIG. 32 is a graph illustrating a result of the simulation using the model having a width of 0.5 mm and a thickness of 0.4 mm with the magnetic sheet disposed thereto with a space of 0.2 mm under the lower side conductor, and illustrating a relationship between the conductor thickness and the resistance value;

FIG. 33 is a schematic diagram illustrating a result of the simulation using the model having a width of 0.5 mm and a thickness of 0.4 mm with the magnetic sheet disposed thereto with a space of 0.2 mm under the lower side conductor, and illustrating the current distribution where each of the conductors has a thickness of 0.15 mm;

FIG. 34 is a graph illustrating a result of the simulation using the model having a width of 0.5 mm and a thickness of 0.3 mm with the magnetic sheet disposed thereto with a space of 0.3 mm under the lower side conductor, and illustrating a relationship between the conductor thickness and the resistance value;

FIG. 35 is a schematic diagram illustrating a result of the simulation using the model having a width of 0.5 mm and a thickness of 0.3 mm with the magnetic sheet disposed thereto with a space of 0.3 mm under the lower side conductor, and illustrating the current distribution where each of the conductors has a thickness of 0.11 mm;

FIG. 36 is a graph illustrating a result of the simulation using the model having a width of 0.3 mm and a thickness of 0.165 mm with the magnetic sheet disposed thereto with a space of 0.1 mm under the lower side conductor, and illustrating a relationship between the conductor thickness and the resistance value;

FIG. 37 is a graph illustrating a result of the simulation using the model having a width of 0.3 mm and a thickness of 0.215 mm with the magnetic sheet disposed thereto with a space of 0.05 mm under the lower side conductor, and illustrating a relationship between the conductor thickness and the resistance value; and FIG. 38 is a schematic diagram illustrating a basic circuit structure of a transponder.

DETAILED DESCRIPTION

Embodiments are now described in detail with reference to drawings.

Figure 1:
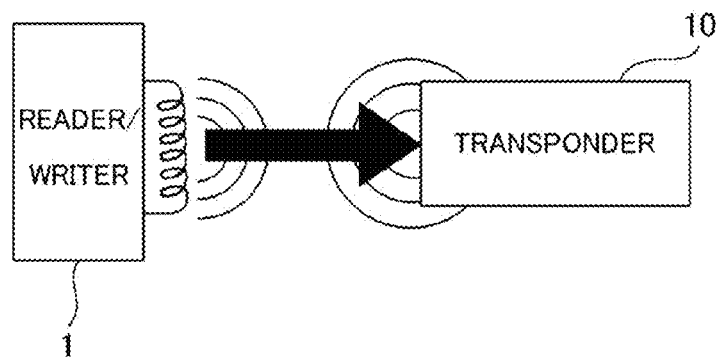
FIG. 1 is a block diagram illustrating a radio frequency identification (RFID) system using a transponder according to an embodiment.

Referring to FIG. 1, a transponder 10 used in a radio frequency identification (RFID) system according to the embodiment is illustrated. The transponder 10, serving as a non-contact type integrated circuit (IC) card, is not only capable of storing various data in a readable and/or writable manner therein, but also has a communication function, so that a prescribed reader/writer 1 reads and/or writes the data with respect to the transponder 1 in a non-contact manner by wireless communications between the transponder 10 and the prescribed reader/writer 1. Particularly, the transponder 10 includes an antenna coil (loop antenna), formed of a printed antenna including an antenna conductor pattern, mounted on each surface of a base material serving as a prescribed resin substrate. The transponder 10 is formed by properly regulating a conductor thickness of the antenna coils and a thickness of the base material sandwiched between the antenna coils.

Particularly, the transponder 10 has thereinside a circuit substrate including at least the antenna coil and an IC chip mounted thereon.

Figure 2:
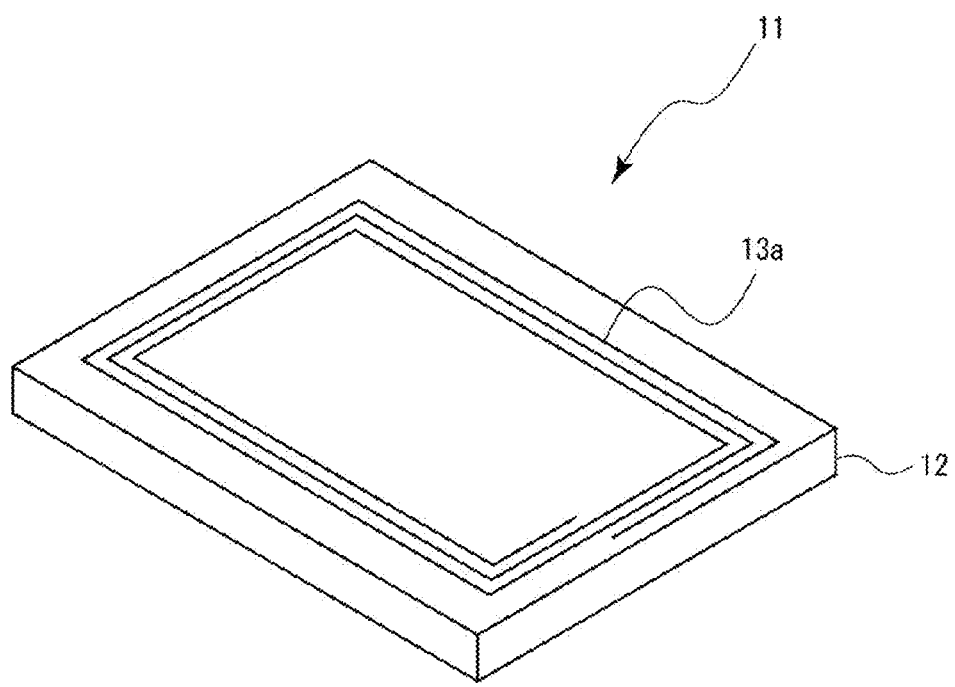
FIG. 2 is a perspective view illustrating an antenna circuit for the transponder according to the embodiment.
Figure 3:
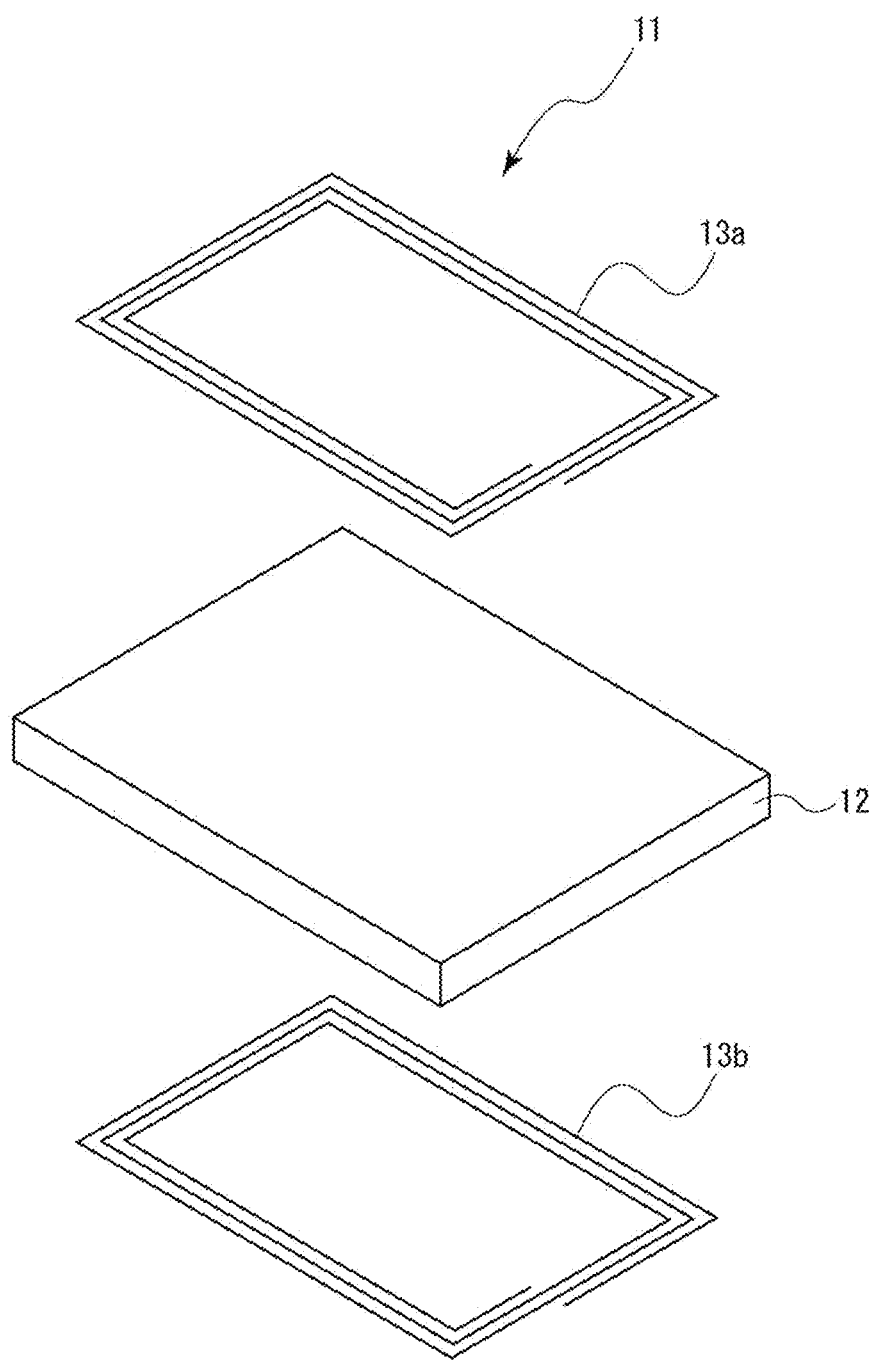
FIG. 3 is an exploded perspective view illustrating the antenna circuit of FIG. 2.

Referring to FIGS. 2 and 3, the circuit substrate for the transponder 10 is briefly illustrated in a schematic perspective view and an exploded perspective view, respectively. The circuit substrate includes an antenna circuit 11 and an integrated circuit chip mounted with respect to the antenna circuit 11. Herein, the antenna circuit 11 includes at least: a prescribed base material 12 formed by providing prescribed conductive foil such as copper foil on both surfaces of a prescribed insulating support member; and antenna conductors 13$a$, 13$b$ each of which has a same prescribed conductor pattern forming the antenna coil. The integrated circuit chip is formed by integrating various members such as a diode bridge, a central processing unit (CPU), a read only memory (ROM), and an electrically erasable programmable read only memory (EEPROM) as a single semiconductor chip, so that the transponder 10 functions.

The antenna circuit 11, for example, includes a main surface thereof formed in a substantially rectangular card shape. In the antenna circuit 11, the base material 12 can be any base material generally used for a printed wiring board. Particularly, the base material 12 is formed using a rigid substrate including the prescribed conductor foil such as the copper foil provided on both surfaces thereof. For example, such a rigid substrate can be: a paper phenol substrate defined as grades of XXP, XPC, and the like by the National Electrical Manufacturers Association (NEMA); a paper polyester substrate defined as a grade of FR-2; a paper epoxy substrate defined as a grade of FR-3; a glass paper composite epoxy substrate defined as a grade of CEM-1; a glass nonwoven paper composite epoxy substrate defined as a grade of CHE-3; a glass fabric epoxy substrate defined as a grade of G-10; and a glass fabric epoxy substrate defined as a grade of FR-4. Among such substrates, the glass fabric epoxy substrate (FR-4) has a self extinguishing property and a low hygroscopicity, and tends not to change the dimension thereof, thereby being preferred.

The conductor foil on the both surfaces of the base material 12 are photo-etched, so that the antenna circuit 11 includes the antenna conductors 13$a$, 13$b$, serving as radiation electrodes, exposed on front and back surfaces thereof. In the antenna circuit 11, particularly, the base material 12 includes the front and back surfaces on which the antenna conductors 13$a$, 13$b$ are respectively disposed opposite to each other. Herein, each of the antenna conductors 13$a$, 13$b$ is provided in a whorl shape. As illustrated in FIGS. 2 and 3, the whorl shaped antenna conductors 13$a$, 13$b$ are provided along each side of the base material 12. However, the antenna conductors 13$a$, 13$b$ can have any antenna pattern, for example, the antenna conductors 13$a$, 13$b$ can be wound in a substantially concentric circle shape, as long as each of the antenna conductors 13$a$, 13$b$ functions as an antenna coil.

Moreover, the antenna circuit 11 includes a plurality of through holes (not shown) including the conductor foil provided inside thereof such that the plural through holes are pierced through from the front surface to the back surface of the base material 12. The antenna conductors 13$a$, 13$b$ are electrically connected in parallel through the through holes. Accordingly, the antenna circuit 11 can reduce the wiring resistance more compared to a case where the antenna conductor is only formed on one of the surfaces of the base material 12.

The antenna circuit 11, formed by processing the base material 12 having such a double surface substrate, includes a prescribed IC chip mounted thereon, and is disposed inside the transponder 10. The antenna circuit 11 preferably includes a magnetic sheet (not shown) disposed to at least one of surface sides thereof, so that the transponder 10 can reduce not only an influence on the antenna coil caused by a metal member provided in the periphery thereof, but also an occurrence of electromagnetic wave interference. Such a magnetic sheet is formed by, for example, dispersion or mixture of a suitable amount of flat soft magnetic powder with a binder such as rubber or plastic resin. The flat soft magnetic powder can be made of a soft magnetic material such as a magnetic stainless (Fe—Cr—Al—Si type alloy), Sendust (Fe—Si—Al type alloy), Permalloy (Fe—Ni type alloy), silicon copper (Fe—Cu—Si type alloy), Fe—Si type alloy, Fe—Si—B (—Cu—Nb) type alloy, Fe—Ni—Cr—Si type alloy, Fe—Si—Cr type alloy, and Fe—Si—Al—Ni—Cr type alloy. In a case where the transponder 10 is installed in a mobile communication device such as a mobile phone, for example, the magnetic sheet is disposed to reduce the possibility of communication distance shortening caused by the influence of a metal case or a battery pack of the mobile communication device, thereby capable of enhancing a flux concentration effect and providing stable communications.

Since the transponder 10 including the antenna circuit 11 was assumed to be used in a widely used short-wave band (13.56 MHz), simulations were performed to verify the effect of reducing the wiring resistance by the connection of the antenna conductors 13$a$, 13$b$ in parallel.

In a case where a commonly used substrate includes thereon a copper pattern having a width of 0.3 mm and a thickness of 0.05 mm, the resistance is 2.0748 Ω/m in the short-wave band (13.56 MHz). Herein, where the thickness of the copper pattern is doubled to 0.1 mm, the resistance becomes 1.6657 Ω/m. Where the copper patterns having a thickness of 0.05 mm are formed on the both surfaces of the double surface substrate having a thickness of 0.065 mm provided by combination of the base material and an adhesive agent, and are connected in parallel through the through holes, the resistance is 1.291 Ω/m. That is, the resistance value is approximately 78% relative to a case where the thickness of the copper pattern is doubled to 0.1 mm of a single layer.

Accordingly, the parallel connection of the antenna conductors 13a, 13b in the antenna circuit 11 can allow the reduction of the wiring resistance. The resistance value of 1.291 Ω/m in a case of the parallel connection of the copper patterns is approximately 62% relative to the resistance value of 2.0748 Ω/m in a case of providing the copper patterns having the same thickness on one surface of the base material.

Figure 4:
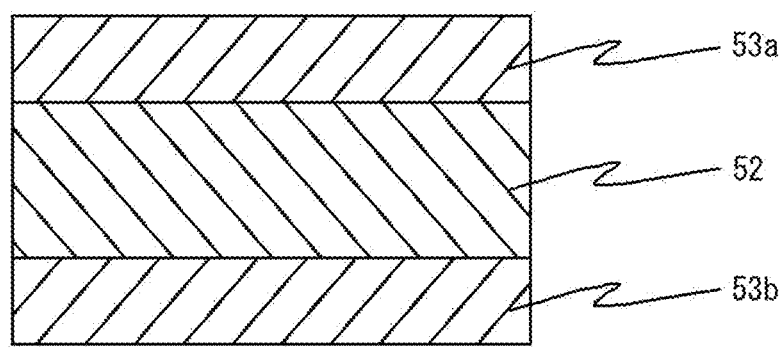
FIG. 4 is a schematic diagram illustrating an antenna circuit model used in a simulation.

Accordingly, simulations were performed by changing the space between the two antenna conductors in the short-wave band (13.56 MHz) to verify the above phenomena in detail. That is, the simulations were performed by changing the thickness of the base material sandwiched between the two antenna conductors, and determined a relationship of the resistance values with respect to the space. Particularly, the simulations were performed using a model having two copper-made conductors 53a, 53b, corresponding to the antenna conductors 13a, 13b, disposed on both sides (i.e., an upper side and a lower side) of a dielectric 52 corresponding to the base material 12 as illustrated in FIG. 4. The conductors 53a, 53b are respectively referred to as an upper side conductor 53a and a lower side conductor 53b as may be necessary. Each of the conductors 53a, 53b was constant in size having a width of 0.33 mm and a thickness of 0.55 mm. The dielectric 52 had a dielectric constant of "1." The result is illustrated in TABLE 1.

between the two conductors 53a, 53b increases. In a case where the space between the two conductors 53a, 53b reaches the infinite value, the resistance value is assumed to be ½ of the resistance value of the conductor 53a. Accordingly, in a case where the two antenna conductors are connected in parallel, the resistance value is not ½ of the resistance value of one antenna conductor unless the space between the antenna conductors, or namely, the thickness of the base material, becomes the infinite value. Such a result is provided by the influence of the skin effect by flowing the high frequency current to the antenna conductor and by the influence of the proximity effect by disposing the two antenna conductors opposite to each other through the base material.

Therefore, the space between the antenna conductors needs to be increased as much as possible to reduce the wiring resistance in the antenna circuit. However, the thickness of the base material has a limitation according to a specification thereof, causing difficulty in increasing the space in a practical manner. Accordingly, the inventor of the present invention has thought that a ratio between the thickness of each of the two antenna conductors and the thickness of the base material can be controlled, so that a suitable design can be provided with consideration of the influences of the skin effect and the proximity effect. Therefore, simulations were performed by changing the thickness of the two antenna conductors and the

TABLE 1

| CONDUCTOR SPACING (BASE MATERIAL THICKNESS) [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.02 | 2.826 | 9.46E−07 | 2.830 | 9.46E−07 | 1.415 |
| 0.04 | 2.702 | 9.49E−07 | 2.708 | 9.49E−07 | 1.354 |
| 0.06 | 2.613 | 9.51E−07 | 2.611 | 9.51E−07 | 1.305 |
| 0.08 | 2.548 | 9.53E−07 | 2.541 | 9.53E−07 | 1.271 |
| 0.10 | 2.484 | 9.54E−07 | 2.479 | 9.54E−07 | 1.240 |
| 0.12 | 2.438 | 9.55E−07 | 2.433 | 9.55E−07 | 1.217 |
| 0.14 | 2.401 | 9.56E−07 | 2.390 | 9.56E−07 | 1.195 |
| 0.16 | 2.358 | 9.57E−07 | 2.354 | 9.57E−07 | 1.177 |
| 0.18 | 2.404 | 9.58E−07 | 2.333 | 9.58E−07 | 1.166 |
| 0.20 | 2.377 | 9.58E−07 | 2.308 | 9.58E−07 | 1.154 |
| 0.22 | 2.283 | 9.58E−07 | 2.275 | 9.59E−07 | 1.138 |
| 0.24 | 2.264 | 9.59E−07 | 2.256 | 9.59E−07 | 1.128 |
| 0.26 | 2.248 | 9.59E−07 | 2.238 | 9.59E−07 | 1.119 |
| 0.28 | 2.235 | 9.59E−07 | 2.224 | 9.60E−07 | 1.112 |
| 0.30 | 2.219 | 9.60E−07 | 2.210 | 9.60E−07 | 1.105 |
| 0.32 | 2.205 | 9.60E−07 | 2.199 | 9.60E−07 | 1.099 |
| 0.34 | 2.193 | 9.60E−07 | 2.189 | 9.60E−07 | 1.095 |
| 0.36 | 2.188 | 9.60E−07 | 2.178 | 9.60E−07 | 1.089 |
| 0.38 | 2.182 | 9.60E−07 | 2.172 | 9.60E−07 | 1.086 |
| 0.40 | 2.171 | 9.61E−07 | 2.164 | 9.60E−07 | 1.082 |
| 0.42 | 2.166 | 9.61E−07 | 2.159 | 9.61E−07 | 1.079 |
| 0.44 | 2.160 | 9.61E−07 | 2.154 | 9.61E−07 | 1.077 |
| 0.46 | 2.156 | 9.61E−07 | 2.150 | 9.61E−07 | 1.075 |
| 0.48 | 2.154 | 9.61E−07 | 2.144 | 9.61E−07 | 1.072 |
| 0.50 | 2.148 | 9.61E−07 | 2.140 | 9.61E−07 | 1.070 |

Figure 5:
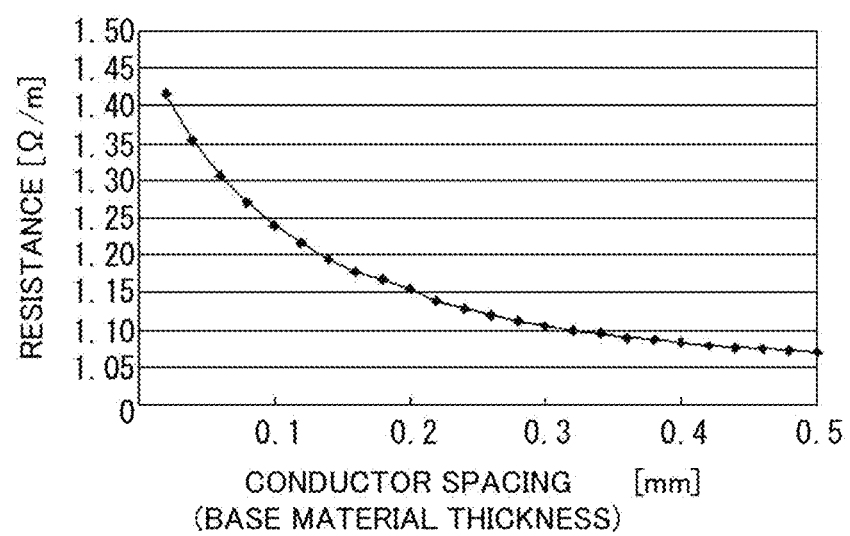
FIG. 5 is a graph illustrating a result of the simulation using the model including a conductor having a width of 0.3 mm and a thickness of 0.05 mm and illustrating a relationship between conductor spacing and a resistance value.

TABLE 1 shows that the resistance value changes as the space between the two conductors 53a, 53b changes. That is, the resistance value changes as the thickness of the base material 52 changes. Then, the relationship of the resistance values with respect to the space between the two conductors 53a, 53b was determined. The result obtained by the determination of the relationship is illustrated in FIG. 5. The result shows that an overall resistance value is monotonically reduced in a case of the parallel connection as the space thickness of the base material in the short-wave band (13.56 MHz) using the model as illustrated in FIG. 4 to determine a suitable design guide, and examined the current distribution flowing to the antenna conductors.

The model was arranged to have a width of 0.1 mm and a thickness of 0.1 mm, and the simulations were performed by changing the thickness of the two conductors 53a, 53b within a range of 0.1 mm (the thickness of the model) as illustrated in TABLE 2. The dielectric 52 had the dielectric constant of "1." The result is illustrated in TABLE 2.

TABLE 2

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.005 | 34.772 | 1.23E−06 | 34.771 | 1.23E−06 | 17.386 |
| 0.010 | 17.775 | 1.21E−06 | 17.774 | 1.21E−06 | 8.887 |
| 0.015 | 12.240 | 1.20E−06 | 12.239 | 1.20E−06 | 6.120 |
| 0.020 | 9.575 | 1.19E−06 | 9.575 | 1.19E−06 | 4.787 |
| 0.025 | 8.084 | 1.18E−06 | 8.084 | 1.18E−06 | 4.042 |
| 0.030 | 7.209 | 1.17E−06 | 7.210 | 1.17E−06 | 3.605 |
| 0.035 | 6.710 | 1.16E−06 | 6.711 | 1.16E−06 | 3.355 |
| 0.040 | 6.461 | 1.15E−06 | 6.462 | 1.15E−06 | 3.231 |
| 0.045 | 6.398 | 1.14E−06 | 6.399 | 1.14E−06 | 3.199 |
| 0.050 | 6.502 | 1.12E−06 | 6.504 | 1.12E−06 | 3.252 |

Figure 6:
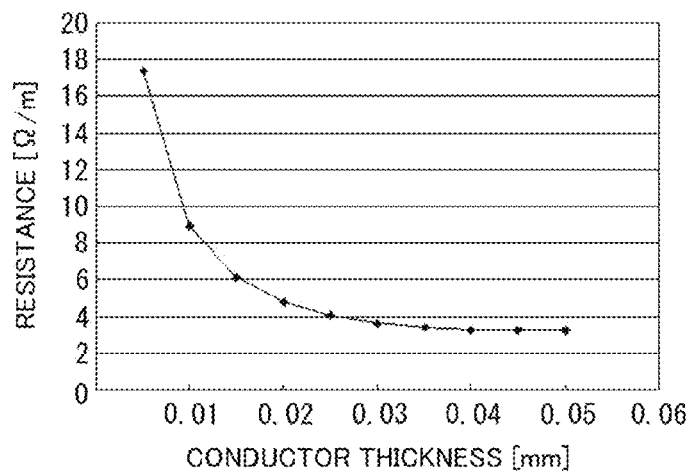
FIG. 6 is a graph illustrating a result of the simulation using the model having a width of 0.1 mm and a thickness of 0.1 mm and illustrating a relationship between the conductor thickness and the resistance value.
Figure 7:
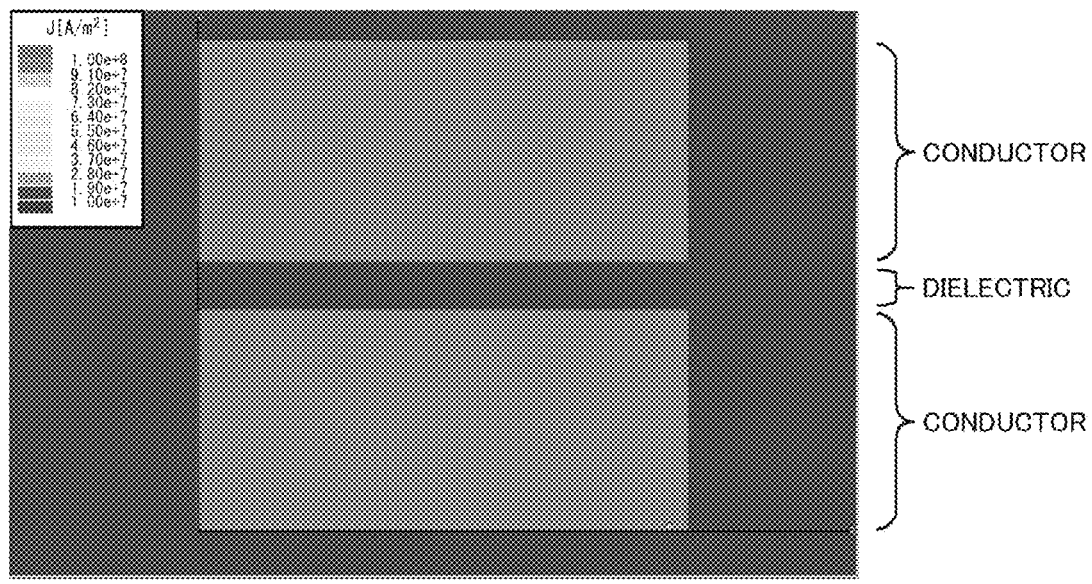
FIG. 7 is a schematic diagram illustrating a result of the simulation using the model having a width of 0.1 mm and a thickness of 0.1 mm and illustrating current distribution where each of the conductors has a thickness of 0.045 mm.

TABLE 2 shows that the resistance value changes as the thickness of each of the two conductors 53a, 53b changes. Then, the relationship of the resistance values with respect to the thickness of each of the two conductors 53a, 53b was determined. The result obtained by the determination of the relationship is illustrated in FIG. 6. The result shows that: the overall resistance value in a case of the parallel connection is reduced with an increase in the thickness of each of the two conductors 53a, 53b; where each of the two conductors 53a, 53b has the thickness of 0.045 mm, that is, where each of the two conductors 53a, 53b has the thickness of approximately 45% of the overall thickness formed of the conductor 53a, 53b, and the dielectric 52, however, the overall resistance value becomes a minimum value (3.199 Ω/m); and where each of the two conductors 53a, 53b has the thickness of greater than or equal to 0.045 mm, the overall resistance value turns into an increase. Referring to a current distribution chart of FIG. 7, the current distribution where each of the two conductors 53a, 53b has the thickness of 0.045 mm is illustrated. As illustrated in FIG. 7, the current distribution is substantially uniform across the entire two conductors 53a, 53b, and the influences of the skin effect and the proximity effect are hardly recognized. Where each of the conductors has the thickness of greater than or equal to 0.045 mm, however, the overall resistance value turns into an increase. Accordingly, the influences of the skin effect and the proximity effect are assumed to exist slightly. In other words, the skin effect and the proximity effect are assumed not to appear in a case where the overall thickness formed of the conductors 53a, 53b, and the dielectric 52 is less than the prescribed thickness, and the skin effect and the proximity effect are assumed to notably appear as the overall thickness increases to be greater than the prescribed thickness.

Accordingly, similar simulations were performed using a model having a thickness less than the above model to verify the assumptions stated above. Particularly, the model was arranged to have a width of 0.05 mm and a thickness of 0.05 mm, and the simulations were performed by changing the thickness of the two conductors 53a, 53b within a range of 0.05 mm (the thickness of the model) as illustrated in TABLE 3. The dielectric 52 had the dielectric constant of "1."

TABLE 3

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.005 | 69.112 | 1.35E−06 | 69.112 | 1.35E−06 | 34.556 |
| 0.010 | 34.781 | 1.34E−06 | 34.781 | 1.34E−06 | 17.390 |
| 0.015 | 23.493 | 1.32E−06 | 23.494 | 1.32E−06 | 11.747 |
| 0.020 | 18.098 | 1.30E−06 | 18.098 | 1.30E−06 | 9.049 |
| 0.025 | 15.295 | 1.29E−06 | 15.296 | 1.29E−06 | 7.648 |

Figure 8:
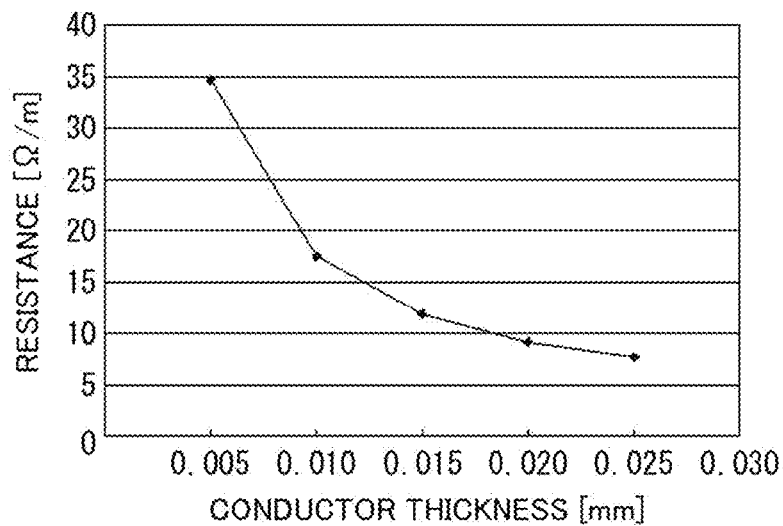
FIG. 8 is a graph illustrating a result of the simulation using the model having a width of 0.05 mm and a thickness of 0.05 mm and illustrating a relationship between the conductor thickness and the resistance value.

TABLE 3 shows that the change in the thickness of the two conductors 53a, 53b changes the resistance value. Then, the relationship of the resistance values with respect to the thickness of each of the two conductors 53a, 53b was determined. The result obtained by the determination of the relationship is illustrated in FIG. 8. The result shows that the overall resistance value is monotonically reduced in a case of the parallel connection as the thickness of each of the two conductors 53a, 53b increases. That is, the overall resistance value reduced with the increase in the thickness of each of the two conductors 53a, 53b does not have a tendency to turn into an increase. Accordingly, the result shows that the thickness of each of the two conductors 53a, 53b becomes twice as much as that of the skin where the overall thickness formed of the conductors 53a, 53b, and the dielectric 52 is reduced to approximately 0.05 mm, thereby not having the influences of the skin effect and the proximity effect in a practical manner. Therefore, the influences of the skin effect and the proximity effect are assumed to appear where the overall thickness of the conductors 53a, 53b, and the dielectric 52 is greater than or equal to approximately 0.1 mm.

Accordingly, similar simulations were performed by changing a thickness of a model towards a direction in which the thickness was increased greater than 0.1 mm. The model was arranged to have a width of 0.15 mm and a thickness of 0.15 mm, and the simulations were performed by changing the thickness of the two conductors 53a, 53b within a range of 0.15 mm (the thickness of the model) as illustrated in TABLE 4. The dielectric 52 had the dielectric constant of "1."

TABLE 4

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.01 | 12.203 | 1.14E−06 | 12.198 | 1.14E−06 | 6.100 |
| 0.02 | 6.798 | 1.12E−06 | 6.776 | 1.12E−06 | 3.393 |
| 0.03 | 5.155 | 1.10E−06 | 5.134 | 1.10E−06 | 2.572 |
| 0.04 | 4.490 | 1.09E−06 | 4.492 | 1.09E−06 | 2.246 |
| 0.05 | 4.237 | 1.07E−06 | 4.237 | 1.07E−06 | 2.118 |
| 0.06 | 4.174 | 1.05E−06 | 4.173 | 1.05E−06 | 2.087 |
| 0.07 | 4.274 | 1.03E−06 | 4.274 | 1.03E−06 | 2.137 |

Figure 9:
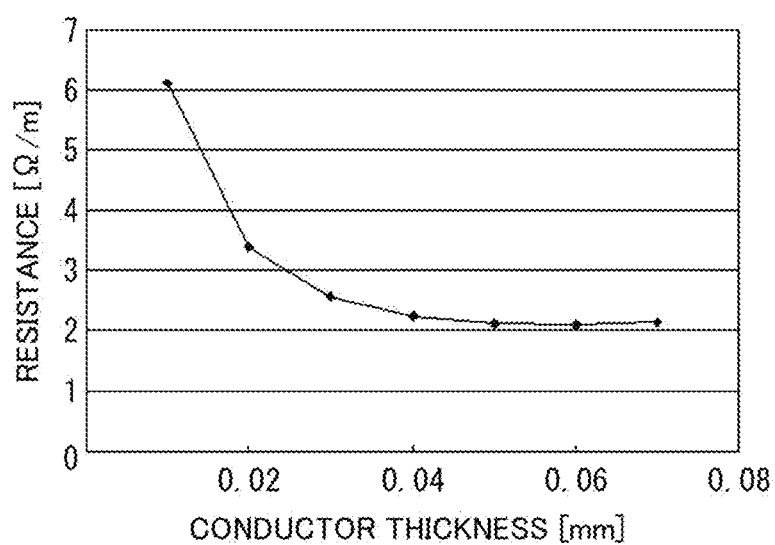
FIG. 9 is a graph illustrating a result of the simulation using the model having a width of 0.15 mm and a thickness of 0.15 mm and illustrating a relationship between the conductor thickness and the resistance value.

TABLE 4 shows that the resistance value changes as the thickness of each of the two conductors 53a, 53b changes. Then, the relationship of the resistance values with respect to the thickness of each of the two conductors 53a, 53b was determined. The result obtained by the determination of the relationship is illustrated in FIG. 9. The result shows that: the overall resistance value in a case of the parallel connection is reduced with an increase in the thickness of each of the two conductors 53a, 53b; where each of the two conductors 53a, 53b has the thickness of 0.06 mm, however, the overall resistance value becomes a minimum value (2.087 Ω/m), that is, where each of the two conductors 53a, 53b has the thickness of approximately 40% of the overall thickness formed of the conductor 53a, 53b, and the dielectric 52, the overall resistance value becomes the minimum value (2.087 Ω/m); and where each of the two conductors 53a, 53b has the thickness of greater than or equal to 0.06 mm, the overall resistance value turns into an increase. Referring to a current distribution chart of FIG. 10, the current distribution where each of the two conductors 53a, 53b has the thickness of 0.06 mm is illustrated. Since the current distribution is the highest on the surfaces of the respective two conductors 53a, 53b and is reduced further and further in an inner portion of the respective conductors 53a, 53b as illustrated in FIG. 10, the influence of the skin effect is found to appear. Moreover, the two conductors 53a, 53b have respective surfaces face to face to each other, and the electric current tends not to flow in a number of regions on the face-to-face surfaces, so that the influence of the proximity effect is found to appear.

Now, the model was arranged to have a width of 0.2 mm and a thickness of 0.2 mm, and the simulations were performed by changing the thickness of the two conductors 53a, 53b within a range of 0.2 mm (the thickness of the model) as illustrated in TABLE 5. The dielectric 52 had the dielectric constant of "1."

TABLE 5

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.01 | 9.4189 | 1.08E−06 | 9.4184 | 1.08E−06 | 4.709 |
| 0.02 | 5.3081 | 1.07E−06 | 5.3078 | 1.07E−06 | 2.654 |
| 0.03 | 4.0267 | 1.05E−06 | 4.0261 | 1.05E−06 | 2.013 |
| 0.04 | 3.4971 | 1.04E−06 | 3.4966 | 1.04E−06 | 1.748 |
| 0.05 | 3.2546 | 1.03E−06 | 3.2546 | 1.03E−06 | 1.627 |
| 0.06 | 3.1398 | 1.01E−06 | 3.1393 | 1.01E−06 | 1.570 |
| 0.07 | 3.0924 | 9.97E−07 | 3.0922 | 9.97E−07 | 1.546 |
| 0.08 | 3.0964 | 9.82E−07 | 3.0962 | 9.82E−07 | 1.548 |
| 0.09 | 3.1655 | 9.65E−07 | 3.1654 | 9.65E−07 | 1.583 |
| 0.10 | 3.3304 | 9.47E−07 | 3.3303 | 9.47E−07 | 1.665 |

TABLE 5 shows that the resistance value changes as the thickness of each of the two conductors 53a, 53b changes even in a case where the width of the model and the overall thickness are changed. Then, the relationship of the resistance values with respect to the thickness of each of the two conductors 53a, 53b was determined. The result obtained by the determination of the relationship is illustrated in FIG. 11. The result shows that: the overall resistance value in a case of the parallel connection is reduced with an increase in the thickness of the two conductors 53a, 53b; where each of the two conductors 53a, 53b has a thickness of 0.07 mm, that is, where each of the two conductors 53a, 53b has a thickness of approximately 35% of the overall thickness formed of the conductors 53a, 53b, and the dielectric 52, the overall resistance value becomes the minimum value (1.546 Ω/m); and where each of the two conductors 53a, 53b has the thickness of greater than or equal to 0.07 mm, the overall resistance value turns into an increase. Referring to a current distribution chart of FIG. 12, the current distribution where each of the two conductors 53a, 53b has the thickness of 0.07 mm is illustrated. As shown in FIG. 12, the current distribution is the highest on the surfaces of the respective two conductors 53a, 53b by the skin effect. However, the electric current tends not to flow easily on the face-to-face surfaces of the respective two conductors 53a, 53b by the proximity effect. Therefore, the influences of the skin effect and the proximity effect were verified to notably appear as the increase in the overall thickness formed of the conductors 53a, 53b, and the dielectric 52.

Moreover, the model was arranged to have a width of 0.3 mm and a thickness of 0.3 mm, and the simulations were performed by changing the thickness of the two conductors 53a, 53b within a range of 0.3 mm (the thickness of the model) as illustrated in TABLE 6. The dielectric 52 had the dielectric constant of "1."

TABLE 6

| CONDUCTOR THICKNESS [mm] | LOWER SIDE CONDUCTOR | | UPPER SIDE CONDUCTOR | | PARALLEL CONNECTION |
| --- | --- | --- | --- | --- | --- |
| | RESISTANCE [Ω/m] | INDUCTANCE [H/m] | RESISTANCE [Ω/m] | INDUCTANCE [H/m] | RESISTANCE [Ω/m] |
| 0.01 | 6.602 | 1.00E−06 | 6.602 | 1.00E−06 | 3.301 |
| 0.02 | 3.766 | 9.87E−07 | 3.765 | 9.87E−07 | 1.883 |
| 0.03 | 2.861 | 9.78E−07 | 2.861 | 9.78E−07 | 1.431 |
| 0.04 | 2.477 | 9.68E−07 | 2.476 | 9.68E−07 | 1.238 |
| 0.05 | 2.291 | 9.59E−07 | 2.290 | 9.59E−07 | 1.145 |
| 0.06 | 2.192 | 9.49E−07 | 2.192 | 9.49E−07 | 1.096 |
| 0.07 | 2.134 | 9.40E−07 | 2.133 | 9.40E−07 | 1.067 |
| 0.08 | 2.095 | 9.30E−07 | 2.094 | 9.30E−07 | 1.047 |
| 0.09 | 2.066 | 9.20E−07 | 2.065 | 9.20E−07 | 1.033 |
| 0.10 | 2.046 | 9.10E−07 | 2.046 | 9.10E−07 | 1.023 |
| 0.11 | 2.039 | 9.00E−07 | 2.039 | 9.00E−07 | 1.019 |
| 0.12 | 2.049 | 8.89E−07 | 2.048 | 8.89E−07 | 1.024 |
| 0.13 | 2.082 | 8.78E−07 | 2.081 | 8.78E−07 | 1.041 |
| 0.14 | 2.153 | 8.65E−07 | 2.152 | 8.65E−07 | 1.076 |
| 0.15 | 2.293 | 8.51E−07 | 2.292 | 8.51E−07 | 1.146 |

TABLE 6 shows that the resistance value changes as the thickness of each of the two conductors 53a, 53b changes in this case as well. Then, the relationship of the resistance values with respect to the thickness of each of the two conductors 53a, 53b was determined. The result obtained by the determination of the relationship is illustrated in FIG. 13. The result shows that: the overall resistance value in a case of the parallel connection is reduced with an increase in the thickness of each of the two conductors 53a, 53b; where each of the two conductors 53a, 53b has a thickness of 0.11 mm, that is, where each of the two conductors 53a, 53b has a thickness of approximately 36.7% of the overall thickness formed of the conductors 53a, 53b, and the dielectric 52, however, the overall resistance value becomes the minimum value (1.019 Ω/m); and where each of the two conductors 53a, 53b has the thickness of greater than or equal to 0.11 mm, the overall resistance value turns into an increase. Referring to a current distribution chart of FIG. 14, the current distribution where each of the two conductors 53a, 53b has the thickness of 0.07 mm is illustrated. As shown in FIG. 14, the current distribution is the highest on the surfaces of the respective two conductors 53a, 53b by the skin effect. However, the electric current tends not to flow easily on the face-to-face surfaces of the respective two conductors 53a, 53b by the proximity effect.

Moreover, the model was arranged to have a width of 0.5 mm and a thickness of 0.5 mm, and the simulations were performed by changing the thickness of the two conductors 53a, 53b within a range of 0.5 mm (the thickness of the model) as illustrated in TABLE 7. The dielectric 52 had the dielectric constant of "1."

TABLE 7 shows that the resistance value changes as the thickness of each of the two conductors 53a, 53b changes in this case as well. Then, the relationship of the resistance values with respect to the thickness of each of the two conductors 53a, 53b was determined. The result obtained by the determination of the relationship is illustrated in FIG. 15. The result shows that: the overall resistance value in a case of the parallel connection is reduced with an increase in the thickness of each of the two conductors 53a, 53b; where each of the two conductors 53a, 53b has a thickness of 0.18 mm, that is, where each of the two conductors 53a, 53b has a thickness of approximately 36% of the overall thickness formed of the conductors 53a, 53b, and the dielectric 52, however, the overall resistance value becomes the minimum value (0.607 Ω/m); and where each of the two conductors 53a, 53b has the thickness of greater than or equal to 0.18 mm, the overall resistance value turns into an increase. Referring to a current distribution chart of FIG. 16, the current distribution where each of the two conductors 53a, 53b has the thickness of 0.18 mm is illustrated. As shown in FIG. 16, the current distribution is the highest on the surfaces of the respective two conductors 53a, 53b by the skin effect. However, the electric current tends not to flow easily on the face-to-face surfaces of the respective two conductors 53a, 53b by the proximity effect.

In addition, the model was arranged to have a width of 0.8 mm and a thickness of 0.8 mm, and the simulations were performed by changing the thickness of the two conductors 53a, 53b within a range of 0.8 mm (the thickness of the model) as illustrated in TABLE 8. The dielectric 52 had the dielectric constant of "1."

TABLE 7

| CONDUCTOR | LOWER SIDE CONDUCTOR | | UPPER SIDE CONDUCTOR | | PARALLEL CONNECTION |
| --- | --- | --- | --- | --- | --- |
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.01 | 4.247 | 8.96E−07 | 4.246 | 8.96E−07 | 2.123 |
| 0.02 | 2.437 | 8.87E−07 | 2.436 | 8.87E−07 | 1.218 |
| 0.03 | 1.854 | 8.81E−07 | 1.853 | 8.80E−07 | 0.927 |
| 0.04 | 1.603 | 8.74E−07 | 1.602 | 8.74E−07 | 0.801 |
| 0.05 | 1.482 | 8.68E−07 | 1.480 | 8.68E−07 | 0.740 |
| 0.06 | 1.419 | 8.62E−07 | 1.417 | 8.62E−07 | 0.709 |
| 0.07 | 1.382 | 8.56E−07 | 1.380 | 8.56E−07 | 0.690 |
| 0.08 | 1.357 | 8.50E−07 | 1.353 | 8.50E−07 | 0.677 |
| 0.09 | 1.333 | 8.44E−07 | 1.328 | 8.44E−07 | 0.665 |
| 0.10 | 1.308 | 8.38E−07 | 1.304 | 8.38E−07 | 0.653 |
| 0.11 | 1.290 | 8.32E−07 | 1.283 | 8.32E−07 | 0.643 |
| 0.12 | 1.266 | 8.26E−07 | 1.262 | 8.26E−07 | 0.632 |
| 0.13 | 1.248 | 8.20E−07 | 1.246 | 8.20E−07 | 0.624 |
| 0.14 | 1.236 | 8.14E−07 | 1.233 | 8.14E−07 | 0.617 |
| 0.15 | 1.228 | 8.09E−07 | 1.222 | 8.08E−07 | 0.612 |
| 0.16 | 1.221 | 8.03E−07 | 1.215 | 8.03E−07 | 0.609 |
| 0.17 | 1.218 | 7.97E−07 | 1.211 | 7.97E−07 | 0.607 |
| 0.18 | 1.218 | 7.91E−07 | 1.211 | 7.90E−07 | 0.607 |
| 0.19 | 1.219 | 7.84E−07 | 1.214 | 7.84E−07 | 0.608 |
| 0.20 | 1.225 | 7.78E−07 | 1.222 | 7.77E−07 | 0.612 |
| 0.21 | 1.241 | 7.71E−07 | 1.236 | 7.70E−07 | 0.619 |
| 0.22 | 1.259 | 7.63E−07 | 1.257 | 7.63E−07 | 0.629 |
| 0.23 | 1.292 | 7.55E−07 | 1.290 | 7.55E−07 | 0.645 |
| 0.24 | 1.342 | 7.47E−07 | 1.339 | 7.47E−07 | 0.670 |
| 0.25 | 1.411 | 7.38E−07 | 1.408 | 7.38E−07 | 0.705 |

TABLE 8

| CONDUCTOR THICKNESS [mm] | LOWER SIDE CONDUCTOR | | UPPER SIDE CONDUCTOR | | PARALLEL CONNECTION |
| --- | --- | --- | --- | --- | --- |
| | RESISTANCE [Ω/m] | INDUCTANCE [H/m] | RESISTANCE [Ω/m] | INDUCTANCE [H/m] | RESISTANCE [Ω/m] |
| 0.01 | 2.8324 | 8.00E−07 | 2.8320 | 7.99E−07 | 1.4161 |
| 0.02 | 1.6265 | 7.94E−07 | 1.6260 | 7.93E−07 | 0.8131 |
| 0.03 | 1.2370 | 7.90E−07 | 1.2358 | 7.89E−07 | 0.6182 |
| 0.04 | 1.0685 | 7.86E−07 | 1.0675 | 7.85E−07 | 0.5340 |
| 0.05 | 0.9890 | 7.81E−07 | 0.9872 | 7.80E−07 | 0.4941 |
| . | . | . | . | . | . |
| . | . | . | . | . | . |
| 0.20 | 0.8005 | 7.24E−07 | 0.7790 | 7.23E−07 | 0.3948 |
| 0.21 | 0.7918 | 7.20E−07 | 0.7730 | 7.19E−07 | 0.3911 |
| 0.22 | 0.7818 | 7.16E−07 | 0.7676 | 7.16E−07 | 0.3873 |
| 0.23 | 0.7811 | 7.13E−07 | 0.7639 | 7.12E−07 | 0.3862 |
| 0.24 | 0.7802 | 7.09E−07 | 0.7602 | 7.09E−07 | 0.3850 |
| 0.25 | 0.7750 | 7.05E−07 | 0.7582 | 7.05E−07 | 0.3833 |
| 0.26 | 0.7731 | 7.02E−07 | 0.7566 | 7.01E−07 | 0.3824 |
| 0.27 | 0.7736 | 6.98E−07 | 0.7554 | 6.97E−07 | 0.3822 |
| 0.28 | 0.7732 | 6.94E−07 | 0.7552 | 6.94E−07 | 0.3821 |
| 0.29 | 0.7750 | 6.90E−07 | 0.7561 | 6.90E−07 | 0.3827 |
| 0.30 | 0.7717 | 6.86E−07 | 0.7573 | 6.86E−07 | 0.3822 |
| 0.31 | 0.7725 | 6.82E−07 | 0.7602 | 6.82E−07 | 0.3831 |
| 0.32 | 0.7738 | 6.78E−07 | 0.7640 | 6.78E−07 | 0.3844 |
| 0.33 | 0.7802 | 6.74E−07 | 0.7704 | 6.73E−07 | 0.3876 |
| 0.34 | 0.7902 | 6.69E−07 | 0.7792 | 6.69E−07 | 0.3923 |
| 0.35 | 0.7913 | 6.64E−07 | 0.7861 | 6.64E−07 | 0.3944 |
| 0.36 | 0.8068 | 6.59E−07 | 0.7992 | 6.59E−07 | 0.4015 |
| 0.37 | 0.8193 | 6.54E−07 | 0.8151 | 6.54E−07 | 0.4086 |
| 0.38 | 0.8412 | 6.49E−07 | 0.8369 | 6.49E−07 | 0.4195 |
| 0.39 | 0.8703 | 6.43E−07 | 0.8662 | 6.43E−07 | 0.4341 |
| 0.40 | 0.9133 | 6.36E−07 | 0.9091 | 6.36E−07 | 0.4556 |

TABLE 8 shows that the resistance value changes as the thickness of each of the two conductors 53a, 53b changes in this case as well. Then, the relationship of the resistance values with respect to the thickness of each of the two conductors 53a, 53b was determined. The result obtained by the determination of the relationship is illustrated in FIG. 17. The result shows that: the overall resistance value in a case of the parallel connection is reduced with an increase in the thickness of each of the two conductors 53a, 53b; where each of the two conductors 53a, 53b has a thickness of 0.28 mm, that is, where each of the two conductors 53a, 53b has a thickness of approximately 35% of the overall thickness formed of the conductors 53a, 53b, and the dielectric 52, however, the overall resistance value becomes the minimum value (0.3821 Ω/m); and where each of the two conductors 53a, 53b has the thickness of greater than or equal to 0.28 mm, the overall resistance value turns into an increase. Referring to a current distribution chart of FIG. 18, the current distribution where each of the two conductors 53a, 53b has the thickness of 0.28 mm is illustrated. As shown in FIG. 18, the current distribution is the highest on the surfaces of the respective two conductors 53a, 53b by the skin effect. However, the electric current tends not to flow easily on the face-to-face surfaces of the respective two conductors 53a, 53b by the proximity effect.

Moreover, the model was arranged to have a width of 1.0 mm and a thickness of 1.0 mm, and the simulations were performed by changing the thickness of the two conductors 53a, 53b within a range of 1.0 mm (the thickness of the model) as illustrated in TABLE 9. The dielectric 52 had the dielectric constant of "1."

TABLE 9

| CONDUCTOR THICKNESS [mm] | LOWER SIDE CONDUCTOR | | UPPER SIDE CONDUCTOR | | PARALLEL CONNECTION |
| --- | --- | --- | --- | --- | --- |
| | RESISTANCE [Ω/m] | INDUCTANCE [H/m] | RESISTANCE [Ω/m] | INDUCTANCE [H/m] | RESISTANCE [Ω/m] |
| 0.01 | 2.3362 | 7.55E−07 | 2.3357 | 7.53E−07 | 1.1680 |
| 0.02 | 1.3404 | 7.50E−07 | 1.3404 | 7.48E−07 | 0.6703 |
| 0.03 | 1.0188 | 7.46E−07 | 1.0180 | 7.45E−07 | 0.5092 |
| 0.04 | 0.8804 | 7.43E−07 | 0.8790 | 7.41E−07 | 0.4399 |
| 0.05 | 0.8150 | 7.39E−07 | 0.8132 | 7.38E−07 | 0.4071 |
| . | . | . | . | . | . |
| . | . | . | . | . | . |
| 0.30 | 0.6316 | 6.63E−07 | 0.6093 | 6.62E−07 | 0.3101 |
| 0.31 | 0.6319 | 6.60E−07 | 0.6079 | 6.59E−07 | 0.3098 |
| 0.32 | 0.6291 | 6.57E−07 | 0.6065 | 6.56E−07 | 0.3088 |
| 0.33 | 0.6290 | 6.54E−07 | 0.6060 | 6.53E−07 | 0.3086 |
| 0.34 | 0.6284 | 6.51E−07 | 0.6058 | 6.50E−07 | 0.3084 |

TABLE 9-continued

| CONDUCTOR | LOWER SIDE CONDUCTOR | | UPPER SIDE CONDUCTOR | | PARALLEL CONNECTION |
|---|---|---|---|---|---|
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.35 | 0.6279 | 6.47E−07 | 0.6061 | 6.47E−07 | 0.3084 |
| 0.36 | 0.6277 | 6.44E−07 | 0.6059 | 6.44E−07 | 0.3083 |
| 0.37 | 0.6276 | 6.41E−07 | 0.6063 | 6.41E−07 | 0.3084 |
| 0.38 | 0.6315 | 6.38E−07 | 0.6098 | 6.37E−07 | 0.3102 |
| 0.39 | 0.6321 | 6.35E−07 | 0.6120 | 6.34E−07 | 0.3109 |
| 0.40 | 0.6291 | 6.31E−07 | 0.6134 | 6.31E−07 | 0.3106 |
| 0.41 | 0.6320 | 6.28E−07 | 0.6173 | 6.27E−07 | 0.3123 |
| 0.42 | 0.6358 | 6.24E−07 | 0.6220 | 6.24E−07 | 0.3144 |
| 0.43 | 0.6343 | 6.21E−07 | 0.6280 | 6.20E−07 | 0.3156 |
| 0.44 | 0.6386 | 6.17E−07 | 0.6321 | 6.16E−07 | 0.3177 |
| 0.45 | 0.6492 | 6.13E−07 | 0.6412 | 6.12E−07 | 0.3226 |
| 0.46 | 0.6567 | 6.09E−07 | 0.6511 | 6.08E−07 | 0.3269 |
| 0.47 | 0.6704 | 6.04E−07 | 0.6654 | 6.04E−07 | 0.3340 |
| 0.48 | 0.6866 | 5.99E−07 | 0.6816 | 5.99E−07 | 0.3420 |
| 0.49 | 0.7087 | 5.95E−07 | 0.7036 | 5.94E−07 | 0.3531 |
| 0.50 | 0.7403 | 5.89E−07 | 0.7349 | 5.89E−07 | 0.3688 |

TABLE 9 shows that the resistance value changes as the thickness of each of the two conductors 53a, 53b changes in this case as well. Then, the relationship of the resistance values with respect to the thickness of each of the two conductors 53a, 53b was determined. The result obtained by the determination of the relationship is illustrated in FIG. 19. The resistance value the upper side conductor 53a is minimized where the thickness of the conductor 53a was arranged to be approximately 34% of the overall thickness formed of the conductors 53a, 53b, and the dielectric 52, and the resistance value of the lower side conductor 53b is minimized where the thickness of the conductor 53a was arranged to be approximately 37% of the overall thickness formed of the conductors 53a, 53b, and the dielectric 52. The result shows that: the overall resistance value in a case of the parallel connection is reduced with an increase in the thickness of each of the two conductors 53a, 53b; where each of the two conductors 53a, 53b has a thickness of 0.36 mm, that is, where each of the two conductors 53a, 53b has a thickness of approximately 36% of the overall thickness formed of the conductors 53a, 53b, and the dielectric 52, however, the overall resistance value becomes the minimum value (0.3083 Ω/m); and where each of the two conductors 53a, 53b has the thickness of greater than or equal to 0.36 mm, the overall resistance value turns into an increase. Referring to a current distribution chart of FIG. 20, the current distribution where each of the two conductors 53a, 53b has the thickness of 0.36 mm is illustrated. As shown in FIG. 20, the current distribution is the highest on the surfaces of the respective two conductors 53a, 53b by the skin effect. However, the electric current tends not to flow easily on the face-to-face surfaces of the respective two conductors 53a, 53b by the proximity effect.

In addition, a model was arranged to have a width and a thickness being different from each other in values. The model, serving as an example, was arranged to have a width of 0.5 mm and a thickness of 0.3 mm, and the simulations were performed by changing the thickness of the two conductors 53a, 53b within a range of 0.3 mm (the thickness of the model) as illustrated in TABLE 10. The dielectric 52 had the dielectric constant of "1."

TABLE 10

| CONDUCTOR | LOWER SIDE CONDUCTOR | | UPPER SIDE CONDUCTOR | | PARALLEL CONNECTION |
|---|---|---|---|---|---|
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.01 | 4.273 | 8.95E−07 | 4.272 | 8.95E−07 | 2.136 |
| 0.02 | 2.469 | 8.86E−07 | 2.468 | 8.86E−07 | 1.234 |
| 0.03 | 1.915 | 8.79E−07 | 1.914 | 8.79E−07 | 0.957 |
| 0.04 | 1.697 | 8.72E−07 | 1.695 | 8.72E−07 | 0.848 |
| 0.05 | 1.596 | 8.65E−07 | 1.595 | 8.65E−07 | 0.798 |
| 0.06 | 1.545 | 8.58E−07 | 1.544 | 8.58E−07 | 0.772 |
| 0.07 | 1.517 | 8.51E−07 | 1.515 | 8.51E−07 | 0.758 |
| 0.08 | 1.498 | 8.43E−07 | 1.497 | 8.43E−07 | 0.749 |
| 0.09 | 1.485 | 8.36E−07 | 1.484 | 8.36E−07 | 0.742 |
| 0.10 | 1.477 | 8.28E−07 | 1.475 | 8.28E−07 | 0.738 |
| 0.11 | 1.474 | 8.20E−07 | 1.473 | 8.20E−07 | 0.737 |
| 0.12 | 1.480 | 8.12E−07 | 1.480 | 8.12E−07 | 0.740 |
| 0.13 | 1.499 | 8.04E−07 | 1.498 | 8.04E−07 | 0.749 |
| 0.14 | 1.534 | 7.95E−07 | 1.533 | 7.95E−07 | 0.767 |
| 0.15 | 1.590 | 7.86E−07 | 1.589 | 7.86E−07 | 0.795 |

TABLE 10 shows that the resistance value changes as the thickness of each of the two conductors 53a, 53b changes in a case where the width and the thickness of the model were different from the each other. Then, the relationship of the resistance values with respect to the thickness of each of the two conductors 53a, 53b was determined. The result obtained by the determination of the relationship is illustrated in FIG. 21. The result shows that: the overall resistance value in a case of the parallel connection is reduced with an increase in the thickness of each of the two conductors 53a, 53b; where each of the two conductors 53a, 53b has a thickness of 0.11 mm, that is, where each of the two conductors 53a, 53b has a thickness of approximately 36.7% of the overall thickness formed of the conductors 53a, 53b, and the dielectric 52, however, the overall resistance value becomes the minimum value (0.737 Ω/m); and where each of the two conductors 53a, 53b has the thickness of greater than or equal to 0.11 mm, the overall resistance value turns into an increase. Such a result is substantially the same as the result obtained by the case using the model having the width of 0.3 mm and the thickness of 0.3 mm. Accordingly, the thickness of the two conductors 53a, 53b, not the width of the two conductors 53a, 53b, is suitably determined in the antenna circuit, so that the resistance value can be minimized. Referring to a current distribution chart of FIG. 22, the current distribution where each of the two conductors 53a, 53b has the thickness of 0.11 mm is illustrated. As shown in FIG. 22, the current distribution is the highest on the surfaces of the respective two conductors 53a, 53b by the skin effect. However, the electric current tends not to flow easily on the face-to-face surfaces of the respective two conductors 53a, 53b by the proximity effect.

According to the above results, the antenna circuit is found to undergo the influences of the skin effect and the proximity effect where the overall thickness formed of the antenna conductors and the base material is greater than or equal to 0.1 mm, and the resistance value is found to be minimized where each of the two antenna conductors connected in parallel has the thickness of greater than or equal to 35% and less than or equal to 45% of the overall thickness formed of the antenna conductor and the base material. Moreover, where the thickness of each of the two antenna conductors connected in parallel is arranged to be greater than or equal to 5% and less than 50% of the overall thickness formed of the antenna conductors and the base material in the antenna circuit, a resistance value having no practical disadvantage can be obtained. In the above simulations, the proportion of the suitable thickness of the antenna conductor with respect to the overall thickness tends to decrease with the increase in the overall thickness formed of the antenna conductors and the base material, and the proportion of the suitable thickness of the antenna conductor with respect to the overall thickness tends to be substantially constant in the range between greater than or equal to 35% and less than or equal to 37% where the overall thickness becomes greater than or equal to 0.2 mm. Such results are assumed to be provided by the influence of the skin effect or the proximity effect notably appeared as long as the space between the antenna conductors is not extremely large where the overall thickness formed of the antenna conductors and the base material is greater than or equal to 0.2 mm. Therefore, where the overall thickness formed of the antenna conductors and the base material is greater than or equal to 0.2 mm and less than or equal to 1.0 mm in the antenna circuit, each of the two antenna conductors connected in parallel preferably has the thickness of greater than or equal to 35% and less than or equal to 37% of the overall thickness formed of the antenna conductors and the base material.

Next, the simulations were performed by changing the dielectric constant of the dielectric 52 corresponding to the base material 12 to verify the influence by the dielectric constant of the base material 12. Particularly, the model having the width of 0.2 mm and the thickness of 0.2 mm as described above was used, and the simulations were performed by changing each of the thickness of the two conductors 53a, 53b where the dielectric 52 had the relative dielectric constants of "2," "3," "4," and "10." The results are shown in TABLE 11 through TABLE 14. The relationships between the resistance values and the thickness of each of the two conductors 53a, 53b in a case of respective relative dielectric constants are illustrated in FIG. 23 through FIG. 26.

TABLE 11

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.010 | 9.419 | 1.08E−06 | 9.418 | 1.08E−06 | 4.709 |
| 0.020 | 5.308 | 1.07E−06 | 5.308 | 1.07E−06 | 2.654 |
| 0.030 | 4.026 | 1.05E−06 | 4.026 | 1.05E−06 | 2.013 |
| 0.040 | 3.497 | 1.04E−06 | 3.497 | 1.04E−06 | 1.748 |
| 0.050 | 3.255 | 1.03E−06 | 3.255 | 1.03E−06 | 1.628 |
| 0.060 | 3.139 | 1.01E−06 | 3.139 | 1.01E−06 | 1.570 |
| 0.070 | 3.092 | 9.97E−07 | 3.092 | 9.97E−07 | 1.546 |
| 0.080 | 3.096 | 9.82E−07 | 3.096 | 9.82E−07 | 1.548 |
| 0.090 | 3.166 | 9.65E−07 | 3.165 | 9.65E−07 | 1.583 |
| 0.099 | 3.331 | 9.47E−07 | 3.330 | 9.47E−07 | 1.665 |

TABLE 12

| CONDUCTOR | LOWER SIDE CONDUCTOR | | UPPER SIDE CONDUCTOR | | PARALLEL CONNECTION |
|---|---|---|---|---|---|
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.010 | 9.419 | 1.08E−06 | 9.418 | 1.08E−06 | 4.709 |
| 0.020 | 5.308 | 1.07E−06 | 5.308 | 1.07E−06 | 2.654 |
| 0.030 | 4.026 | 1.05E−06 | 4.026 | 1.05E−06 | 2.013 |
| 0.040 | 3.497 | 1.04E−06 | 3.497 | 1.04E−06 | 1.748 |
| 0.050 | 3.255 | 1.03E−06 | 3.255 | 1.03E−06 | 1.628 |
| 0.060 | 3.139 | 1.01E−06 | 3.139 | 1.01E−06 | 1.570 |
| 0.070 | 3.092 | 9.97E−07 | 3.092 | 9.97E−07 | 1.546 |
| 0.080 | 3.096 | 9.82E−07 | 3.096 | 9.82E−07 | 1.548 |
| 0.090 | 3.166 | 9.65E−07 | 3.165 | 9.65E−07 | 1.583 |
| 0.099 | 3.331 | 9.47E−07 | 3.330 | 9.47E−07 | 1.665 |

TABLE 13

| CONDUCTOR | LOWER SIDE CONDUCTOR | | UPPER SIDE CONDUCTOR | | PARALLEL CONNECTION |
|---|---|---|---|---|---|
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.010 | 9.419 | 1.08E−06 | 9.418 | 1.08E−06 | 4.709 |
| 0.020 | 5.308 | 1.07E−06 | 5.308 | 1.07E−06 | 2.654 |
| 0.030 | 4.026 | 1.05E−06 | 4.026 | 1.05E−06 | 2.013 |
| 0.040 | 3.497 | 1.04E−06 | 3.497 | 1.04E−06 | 1.748 |
| 0.050 | 3.255 | 1.03E−06 | 3.255 | 1.03E−06 | 1.628 |
| 0.060 | 3.139 | 1.01E−06 | 3.139 | 1.01E−06 | 1.570 |
| 0.070 | 3.092 | 9.97E−07 | 3.092 | 9.97E−07 | 1.546 |
| 0.080 | 3.096 | 9.82E−07 | 3.096 | 9.82E−07 | 1.548 |
| 0.090 | 3.166 | 9.65E−07 | 3.165 | 9.65E−07 | 1.583 |
| 0.099 | 3.331 | 9.47E−07 | 3.330 | 9.47E−07 | 1.665 |

TABLE 14

| CONDUCTOR | LOWER SIDE CONDUCTOR | | UPPER SIDE CONDUCTOR | | PARALLEL CONNECTION |
|---|---|---|---|---|---|
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.010 | 9.419 | 1.08E−06 | 9.418 | 1.08E−06 | 4.709 |
| 0.020 | 5.308 | 1.07E−06 | 5.308 | 1.07E−06 | 2.654 |
| 0.030 | 4.026 | 1.05E−06 | 4.026 | 1.05E−06 | 2.013 |
| 0.040 | 3.497 | 1.04E−06 | 3.497 | 1.04E−06 | 1.748 |
| 0.050 | 3.255 | 1.03E−06 | 3.255 | 1.03E−06 | 1.628 |
| 0.060 | 3.139 | 1.01E−06 | 3.139 | 1.01E−06 | 1.570 |
| 0.070 | 3.092 | 9.97E−07 | 3.092 | 9.97E−07 | 1.546 |
| 0.080 | 3.096 | 9.82E−07 | 3.096 | 9.82E−07 | 1.548 |
| 0.090 | 3.166 | 9.65E−07 | 3.165 | 9.65E−07 | 1.583 |
| 0.099 | 3.331 | 9.47E−07 | 3.330 | 9.47E−07 | 1.665 |

As seen from comparison of TABLE 11 through TABLE 14 and TABLE 5, the same results were obtained even in a case where the dielectric constants were changed. Accordingly, where each of the two antenna conductors connected in parallel has the thickness of greater than or equal to 35% and less than or equal to 45% of the overall thickness formed of the antenna conductors and the base material in the antenna circuit, the resistance value can be minimized regardless of the dielectric constant of the base material.

Next, the simulations were performed to verify the influences exerted in a case where a magnetic sheet was provided. Since the conductor had a skin thickness having a permeability μ' serving as a parameter, the influence was assumed to be exerted on the conductor in a case where the magnetic sheet was disposed.

Particularly, the simulations were performed using a model having the two conductors 53a, 53b disposed on the both surfaces (the upper side and the lower side) of the dielectric 52 and a magnetic sheet 54 disposed below the lower side conductor 53b as illustrated in FIG. 27. Herein, the two conductors 53a, 53b, made of copper, corresponded to the antenna conductors 13a, 13b, and the dielectric 52 corresponded to the base material 12. The magnetic sheet 54 had specifications including: a width of 2.5 mm and a thickness of 0.25 mm; the permeability μ' of 40; a magnetic loss μ" of 0.5; a conductivity of 11 S; and a relative dielectric constant of 1.

First, the model was arranged to have a width of 0.5 mm and a thickness of 0.6 mm, the magnetic sheet 54 was disposed without space between the magnetic sheet 54 and a lower surface of the lower side conductor 53b, and the simulations were performed by changing the thickness of the two conductors 53a, 53b within a range of 0.6 mm (the thickness of the model) as illustrated in TABLE 15. The dielectric 52 had the dielectric constant of "1."

TABLE 15

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.01 | 4.839 | 1.39E−06 | 4.296 | 1.03E−06 | 2.276 |
| 0.02 | 3.042 | 1.37E−06 | 2.465 | 1.02E−06 | 1.362 |
| 0.03 | 2.620 | 1.35E−06 | 1.853 | 1.02E−06 | 1.085 |
| 0.04 | 2.494 | 1.33E−06 | 1.571 | 1.01E−06 | 0.964 |
| 0.05 | 2.399 | 1.31E−06 | 1.432 | 1.01E−06 | 0.897 |
| 0.06 | 2.298 | 1.29E−06 | 1.359 | 1.01E−06 | 0.854 |
| 0.07 | 2.227 | 1.27E−06 | 1.319 | 1.00E−06 | 0.828 |
| 0.08 | 2.149 | 1.26E−06 | 1.286 | 9.97E−07 | 0.805 |
| 0.09 | 2.081 | 1.24E−06 | 1.263 | 9.93E−07 | 0.786 |
| 0.10 | 2.029 | 1.23E−06 | 1.225 | 9.89E−07 | 0.764 |
| 0.11 | 1.981 | 1.21E−06 | 1.202 | 9.85E−07 | 0.748 |
| 0.12 | 1.943 | 1.20E−06 | 1.174 | 9.81E−07 | 0.732 |
| 0.13 | 1.911 | 1.19E−06 | 1.148 | 9.78E−07 | 0.717 |
| 0.14 | 1.868 | 1.17E−06 | 1.113 | 9.75E−07 | 0.698 |
| 0.15 | 1.863 | 1.16E−06 | 1.103 | 9.71E−07 | 0.693 |
| 0.16 | 1.843 | 1.15E−06 | 1.077 | 9.68E−07 | 0.680 |
| 0.17 | 1.830 | 1.13E−06 | 1.059 | 9.65E−07 | 0.671 |
| 0.18 | 1.822 | 1.12E−06 | 1.044 | 9.62E−07 | 0.664 |
| 0.19 | 1.823 | 1.11E−06 | 1.029 | 9.59E−07 | 0.658 |
| 0.20 | 1.825 | 1.10E−06 | 1.023 | 9.57E−07 | 0.656 |
| 0.21 | 1.823 | 1.08E−06 | 1.010 | 9.54E−07 | 0.650 |
| 0.22 | 1.826 | 1.07E−06 | 0.999 | 9.51E−07 | 0.646 |
| 0.23 | 1.847 | 1.06E−06 | 0.990 | 9.48E−07 | 0.644 |
| 0.24 | 1.858 | 1.04E−06 | 0.980 | 9.45E−07 | 0.642 |
| 0.25 | 1.885 | 1.03E−06 | 0.973 | 9.43E−07 | 0.642 |
| 0.26 | 1.912 | 1.01E−06 | 0.956 | 9.40E−07 | 0.637 |
| 0.27 | 1.964 | 9.99E−07 | 0.953 | 9.37E−07 | 0.642 |
| 0.28 | 2.038 | 9.82E−07 | 0.953 | 9.34E−07 | 0.649 |
| 0.29 | 2.155 | 9.65E−07 | 0.969 | 9.31E−07 | 0.669 |
| 0.30 | 2.315 | 9.45E−07 | 0.984 | 9.27E−07 | 0.690 |

TABLE 15 shows that the resistance value changes as the thickness of each of the two conductors 53a, 53b changes; however, each of the two conductors 53a, 53b has a different value of the thickness to minimize the resistance value unlike the case where the magnetic sheet is not disposed described above. Then, the relationship of the resistance values with respect to the thickness of each of the two conductors 53a, 53b was determined. The result obtained by the determination of the relationship is illustrated in FIG. 28. The resistance value of the lower side conductor 53b disposed close to the magnetic sheet was greater on the whole than that of the upper side conductor 53a. The resistance value of the upper side conductor 53a was minimized where the conductor 53a had the thickness of approximately 45% of the overall thickness formed of the conductors 53a, 53b and the dielectric 52. The resistance value of the lower side conductor 53b was minimized where the lower side conductor 53b had the thickness of approximately 30% of the overall thickness formed of the conductors 53a, 53b, and the dielectric 52. The result shows that: the overall resistance value in a case of the parallel connection is reduced with an increase in the thickness of each of the two conductors 53a, 53b; where each of the two conductors 53a, 53b has a thickness of 0.26 mm, that is, where each of the two conductors 53a, 53b has a thickness of approximately 43% of the overall thickness formed of the conductors 53a, 53b, and the dielectric 52, however, the overall resistance value becomes the minimum value (0.637 Ω/m); and where each of the two conductors 53a, 53b has the thickness of greater than or equal to 0.26 mm, the overall resistance value turns into an increase. Accordingly, in a case where the two conductors 53a, 53b have the same thickness, the thickness of the conductors 53a, 53b to minimize the resistance value can be seriously influenced by the thickness of the upper side conductor 53a to which the magnetic sheet 54 is not disposed. Referring to a current distribution chart of FIG. 29, the current distribution where each of the two conductors 53a, 53b has the thickness of 0.26 mm is illustrated. As shown in FIG. 29, the electric current tends not to flow easily on the lower surface of the lower side conductor 53b being in close contact with the magnetic sheet 54 while the electric current increases on face-to-face surfaces of the respective two conductors 53a, 53b.

Moreover, the model was arranged to have a width of 0.5 mm and a thickness of 0.5 mm, the magnetic sheet 54 was disposed with a space of 0.1 mm between the lower surface of the lower side conductor 53b and the magnetic sheet 54, and the simulations were performed by changing the thickness of the two conductors 53a, 53b within a range of 0.5 mm (the thickness of the model) as illustrated in TABLE 16. The dielectric 52 had the dielectric constant of "1."

TABLE 16

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.01 | 4.801 | 1.26E−06 | 4.312 | 1.03E−06 | 2.272 |
| 0.02 | 2.899 | 1.24E−06 | 2.479 | 1.02E−06 | 1.336 |
| 0.03 | 2.339 | 1.23E−06 | 1.868 | 1.02E−06 | 1.039 |
| 0.04 | 2.131 | 1.21E−06 | 1.590 | 1.01E−06 | 0.911 |
| 0.05 | 2.027 | 1.20E−06 | 1.453 | 1.01E−06 | 0.847 |
| 0.06 | 1.955 | 1.19E−06 | 1.382 | 1.01E−06 | 0.809 |
| 0.07 | 1.900 | 1.17E−06 | 1.340 | 1.00E−06 | 0.786 |
| 0.08 | 1.855 | 1.16E−06 | 1.308 | 9.96E−07 | 0.767 |
| 0.09 | 1.825 | 1.15E−06 | 1.281 | 9.92E−07 | 0.753 |
| 0.10 | 1.789 | 1.14E−06 | 1.249 | 9.88E−07 | 0.736 |
| 0.11 | 1.765 | 1.13E−06 | 1.221 | 9.84E−07 | 0.722 |
| 0.12 | 1.745 | 1.12E−06 | 1.194 | 9.80E−07 | 0.709 |
| 0.13 | 1.741 | 1.10E−06 | 1.175 | 9.76E−07 | 0.701 |
| 0.14 | 1.723 | 1.09E−06 | 1.150 | 9.72E−07 | 0.690 |
| 0.15 | 1.725 | 1.08E−06 | 1.134 | 9.69E−07 | 0.684 |
| 0.16 | 1.724 | 1.07E−06 | 1.117 | 9.65E−07 | 0.678 |
| 0.17 | 1.730 | 1.06E−06 | 1.103 | 9.62E−07 | 0.673 |
| 0.18 | 1.740 | 1.05E−06 | 1.090 | 9.58E−07 | 0.670 |
| 0.19 | 1.756 | 1.03E−06 | 1.079 | 9.55E−07 | 0.668 |
| 0.20 | 1.778 | 1.02E−06 | 1.069 | 9.51E−07 | 0.668 |
| 0.21 | 1.806 | 1.01E−06 | 1.060 | 9.48E−07 | 0.668 |
| 0.22 | 1.853 | 9.94E−07 | 1.056 | 9.44E−07 | 0.673 |
| 0.23 | 1.919 | 9.80E−07 | 1.058 | 9.40E−07 | 0.682 |
| 0.24 | 2.012 | 9.64E−07 | 1.064 | 9.36E−07 | 0.696 |
| 0.25 | 2.157 | 9.46E−07 | 1.085 | 9.32E−07 | 0.722 |

TABLE 16 shows that the resistance value changes as the thickness of each of the two conductors 53a, 53b changes in a case of changing the width of the model and the overall thickness, and each of the two conductors 53a, 53b has a different value of the thickness to minimize the resistance value. Then, the relationship of the resistance values with respect to the thickness of each of the two conductors 53a, 53b was determined. The result obtained by the determination of the relationship is illustrated in FIG. 30. The resistance value of the lower side conductor 53b being close to the magnetic sheet was greater on the whole than that of the upper side conductor 53a, the resistance value of the conductor 53a was minimized where the conductor 53a had the thickness of approximately 44% of the overall thickness formed of the conductors 53a, 53b, and the dielectric 52, and the resistance value of the lower side conductor 53b was minimized where the conductor 53b had the thickness of approximately 28% of the overall thickness formed of the conductors 53a, 53b, and the dielectric 52. The following result is obtained: the overall resistance value in a case of the parallel connection is reduced with an increase in the thickness of each of the two conductors 53a, 53b; where each of the two conductors 53a, 53b has a thickness of 0.21 mm, that is, where each of the two conductors 53a, 53b has a thickness of approximately 42% of the overall thickness formed of the conductors 53a, 53b, and the dielectric 52, however, the overall resistance value becomes the minimum value (0.668 Ω/m); and where each of the two conductors 53a, 53b has the thickness of greater than or equal to 0.21 mm, the overall resistance value turns into an increase. Based on the result, in a case where the two conductors 53a, 53b have the same thickness, the thickness of the conductors 53a, 53b to minimize the resistance value can be seriously influenced by the thickness of the upper side conductor 53a to which the magnetic sheet 54 is not disposed. Referring to a current distribution chart of FIG. 31, the current distribution where each of the two conductors 53a, 53b has the thickness of 0.21 mm is illustrated. As shown in FIG. 31, the electric current tends not to flow easily on the lower surface of the lower side conductor 53b being in close contact with the magnetic sheet 54 while the electric current increases on the face-to-face surfaces of the respective two conductors 53a, 53b although the electric current flowing on the lower surface of the conductor 53b increases compared to that shown in FIG. 29. Therefore, the space between the conductor 53b and the magnetic sheet 54 can reduce the influence exerted by the magnetic sheet 54 on the resistance value of the conductor 53b.

In addition, the model was arranged to have a width of 0.5 mm and a thickness of 0.4 mm, the magnetic sheet 54 was disposed with a space of 0.2 mm between the lower surface of the lower side conductor 53b and the magnetic sheet 54, and the simulations were performed by changing the thickness of the two conductors 53a, 53b within a range of 0.4 mm (the thickness of the model) as illustrated in TABLE 17. The dielectric 52 had the dielectric constant of "1."

TABLE 17

| CONDUCTOR THICKNESS [mm] | LOWER SIDE CONDUCTOR | | UPPER SIDE CONDUCTOR | | PARALLEL CONNECTION |
|---|---|---|---|---|---|
| | RESISTANCE [Ω/m] | INDUCTANCE [H/m] | RESISTANCE [Ω/m] | INDUCTANCE [H/m] | RESISTANCE [Ω/m] |
| 0.01 | 4.552 | 1.18E−06 | 4.324 | 1.03E−06 | 2.218 |
| 0.02 | 2.710 | 1.16E−06 | 2.492 | 1.02E−06 | 1.298 |

TABLE 17-continued

| CONDUCTOR THICKNESS [mm] | LOWER SIDE CONDUCTOR | | UPPER SIDE CONDUCTOR | | PARALLEL CONNECTION |
| --- | --- | --- | --- | --- | --- |
| | RESISTANCE [Ω/m] | INDUCTANCE [H/m] | RESISTANCE [Ω/m] | INDUCTANCE [H/m] | RESISTANCE [Ω/m] |
| 0.03 | 2.167 | 1.15E−06 | 1.888 | 1.02E−06 | 1.009 |
| 0.04 | 1.972 | 1.14E−06 | 1.619 | 1.01E−06 | 0.889 |
| 0.05 | 1.882 | 1.13E−06 | 1.487 | 1.01E−06 | 0.831 |
| 0.06 | 1.835 | 1.12E−06 | 1.421 | 1.00E−06 | 0.801 |
| 0.07 | 1.798 | 1.11E−06 | 1.381 | 9.99E−07 | 0.781 |
| 0.08 | 1.777 | 1.10E−06 | 1.359 | 9.95E−07 | 0.770 |
| 0.09 | 1.756 | 1.09E−06 | 1.332 | 9.90E−07 | 0.758 |
| 0.10 | 1.734 | 1.08E−06 | 1.298 | 9.85E−07 | 0.742 |
| 0.11 | 1.730 | 1.06E−06 | 1.280 | 9.81E−07 | 0.736 |
| 0.12 | 1.725 | 1.05E−06 | 1.257 | 9.76E−07 | 0.727 |
| 0.13 | 1.726 | 1.04E−06 | 1.237 | 9.72E−07 | 0.721 |
| 0.14 | 1.734 | 1.03E−06 | 1.220 | 9.68E−07 | 0.716 |
| 0.15 | 1.753 | 1.02E−06 | 1.207 | 9.63E−07 | 0.715 |
| 0.16 | 1.776 | 1.01E−06 | 1.196 | 9.59E−07 | 0.715 |
| 0.17 | 1.814 | 9.95E−07 | 1.191 | 9.54E−07 | 0.719 |
| 0.18 | 1.862 | 9.81E−07 | 1.184 | 9.50E−07 | 0.724 |
| 0.19 | 1.951 | 9.67E−07 | 1.200 | 9.45E−07 | 0.743 |
| 0.20 | 2.077 | 9.51E−07 | 1.223 | 9.39E−07 | 0.770 |

TABLE 17 shows that the resistance value changes as the thickness of each of the two conductors 53a, 53b changes in this case as well, and each of the two conductors 53a, 53b has a different value of the thickness to minimize the resistance value. Then, the relationship of the resistance values with respect to the thickness of each of the two conductors 53a, 53b was determined. The result obtained by the determination of the relationship is illustrated in FIG. 32. The resistance value of the lower side conductor 53b being close to the magnetic sheet was greater on the whole than that of the upper side conductor 53a, the resistance value of the upper side conductor 53a was minimized where the upper side conductor 53a had the thickness of approximately 45% of the overall thickness formed of the conductors 53a, 53b, and the dielectric 52, and the resistance value of the lower side conductor 53b was minimized where the conductor 53b had the thickness of approximately 30% of the overall thickness formed of the conductors 53a, 53b, and the dielectric 52. The following result is obtained: the overall resistance value in a case of the parallel connection is reduced with an increase in the thickness of each of the two conductors 53a, 53b; where each of the two conductors 53a, 53b has a thickness of 0.15 mm, that is, where each of the two conductors 53a, 53b has a thickness of approximately 37.5% of the overall thickness formed of the conductors 53a, 53b, and the dielectric 52, however, the overall resistance value becomes the minimum value (0.715 Ω/m); and where each of the two conductors 53a, 53b has the thickness of greater than or equal to 0.15 mm, the overall resistance value turns into an increase. Based on the result, in a case where the two conductors 53a, 53b have the same thickness, the thickness of the conductors 53a, 53b to minimize the resistance value can be seriously influenced by the thickness of the upper side conductor 53a to which the magnetic sheet 54 is not disposed. Referring to a current distribution chart of FIG. 33, the current distribution where each of the two conductors 53a, 53b has the thickness of 0.15 mm is illustrated. As shown in FIG. 33, the electric current flowing on the lower surface of the lower side conductor 53b being in close contact with the magnetic sheet 54 increases compared to the result shown in FIG. 31 while the electric current on the face-to-face surfaces of the respective two conductors 53a, 53b decreases. According to the result, an increase in the space between the conductor 53b and the magnetic sheet 54 can reduce the influence exerted by the magnetic sheet 54 on the resistance value of the conductor 53b.

In addition, the model was arranged to have a width of 0.5 mm and a thickness of 0.3 mm, the magnetic sheet 54 was disposed with a space of 0.3 mm between the lower surface of the lower side conductor 53b and the magnetic sheet 54, and the simulations were performed by changing the thickness of the two conductors 53a, 53b within a range of 0.3 mm (the thickness of the model) as illustrated in TABLE 18. The dielectric 52 had the dielectric constant of "1."

TABLE 18

| CONDUCTOR THICKNESS [mm] | LOWER SIDE CONDUCTOR | | UPPER SIDE CONDUCTOR | | PARALLEL CONNECTION |
| --- | --- | --- | --- | --- | --- |
| | RESISTANCE [Ω/m] | INDUCTANCE [H/m] | RESISTANCE [Ω/m] | INDUCTANCE [H/m] | RESISTANCE [Ω/m] |
| 0.01 | 4.449 | 1.12E−06 | 4.341 | 1.03E−06 | 2.197 |
| 0.02 | 2.634 | 1.11E−06 | 2.509 | 1.02E−06 | 1.285 |
| 0.03 | 2.114 | 1.10E−06 | 1.918 | 1.02E−06 | 1.006 |
| 0.04 | 1.940 | 1.09E−06 | 1.665 | 1.01E−06 | 0.896 |
| 0.05 | 1.875 | 1.08E−06 | 1.545 | 1.01E−06 | 0.847 |
| 0.06 | 1.834 | 1.07E−06 | 1.482 | 1.00E−06 | 0.819 |
| 0.07 | 1.807 | 1.06E−06 | 1.144 | 9.97E−07 | 0.803 |
| 0.08 | 1.799 | 1.05E−06 | 1.425 | 9.91E−07 | 0.795 |
| 0.09 | 1.793 | 1.04E−06 | 1.402 | 9.86E−07 | 0.787 |
| 0.10 | 1.796 | 1.03E−06 | 1.382 | 9.81E−07 | 0.781 |

TABLE 18-continued

| CONDUCTOR | LOWER SIDE CONDUCTOR | | UPPER SIDE CONDUCTOR | | PARALLEL CONNECTION |
|---|---|---|---|---|---|
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.11 | 1.806 | 1.01E−06 | 1.364 | 9.75E−07 | 0.777 |
| 0.12 | 1.831 | 1.00E−06 | 1.352 | 9.70E−07 | 0.778 |
| 0.13 | 1.872 | 9.89E−07 | 1.348 | 9.64E−07 | 0.784 |
| 0.14 | 1.938 | 9.76E−07 | 1.353 | 9.58E−07 | 0.797 |
| 0.15 | 2.045 | 9.61E−07 | 1.376 | 9.52E−07 | 0.823 |

TABLE 18 shows that the resistance value changes as the thickness of each of the two conductors $53a$, $53b$ changes in this case also, and each of the two conductors $53a$, $53b$ has a different value of the thickness to minimize the resistance value. Then, the relationship of the resistance values with respect to the thickness of each of the two conductors $53a$, $53b$ was determined. The result obtained by the determination of the relationship is illustrated in FIG. 34. The resistance value of the lower side conductor $53b$ being close to the magnetic sheet was greater on the whole than that of the upper side conductor $53a$, the resistance value of the conductor $53a$ was minimized where the conductor $53a$ had the thickness of approximately 43% of the overall thickness formed of the conductors $53a$, $53b$, and the dielectric 52, and the resistance value of the lower side conductor $53b$ was minimized where the conductor $53b$ had the thickness of approximately 30% of the overall thickness formed of the conductors $53a$, $53b$, and the dielectric 52. The following result is obtained: the overall resistance value in a case of the parallel connection is reduced with an increase in the thickness of each of the two conductors $53a$, $53b$; where each of the two conductors $53a$, $53b$ has a thickness of 0.11 mm, that is, where each of the two conductors $53a$, $53b$ has a thickness of approximately 37% of the overall thickness formed of the conductors $53a$, $53b$, and the dielectric 52, however, the overall resistance value becomes the minimum value (0.777 Ω/m); and where each of the two conductors $53a$, $53b$ has the thickness of greater than or equal to 0.11 mm, the overall resistance value turns into an increase. Based on the result, in a case where the two conductors $53a$, $53b$ have the same thickness, the thickness of the conductors $53a$, $53b$ to minimize the resistance value can be seriously influenced by the thickness of the upper side conductor $53a$ to which the magnetic sheet 54 is not disposed. Referring to a current distribution chart of FIG. 35, the current distribution where each of the two conductors $53a$, $53b$ has the thickness of 0.11 mm is illustrated. As shown in FIG. 35, the electric current flowing on the lower surface of the conductor $53b$ increases compared to the result shown in FIG. 33 while the electric current on the face-to-face surfaces of the respective two conductors $53a$, $53b$ decreases, thereby appearing the influence of the proximity effect.

Moreover, the model was arranged to have a width of 0.3 mm and a thickness of 0.165 mm as an example having a width and a thickness being different from each other in values, the magnetic sheet 54 was disposed with a space of 0.1 mm between the lower surface of the lower side conductor $53b$ and the magnetic sheet 54, and the simulations were performed by changing the thickness of the two conductors $53a$, $53b$ within a range of 0.165 mm (the thickness of the model) as illustrated in TABLE 19. The dielectric 52 had the dielectric constant of "1."

TABLE 19

| CONDUCTOR | LOWER SIDE CONDUCTOR | | UPPER SIDE CONDUCTOR | | PARALLEL CONNECTION |
|---|---|---|---|---|---|
| THICKNESS [mm] | RESISTANCE [Ω/m] | INDUCTANCE [H/m] | RESISTANCE [Ω/m] | INDUCTANCE [H/m] | RESISTANCE [Ω/m] |
| 0.01 | 7.085 | 1.39E−06 | 6.783 | 1.26E−06 | 3.465 |
| 0.02 | 4.297 | 1.37E−06 | 3.921 | 1.25E−06 | 2.050 |
| 0.03 | 3.612 | 1.35E−06 | 3.012 | 1.24E−06 | 1.642 |
| 0.04 | 3.483 | 1.33E−06 | 2.615 | 1.23E−06 | 1.493 |
| 0.05 | 3.472 | 1.31E−06 | 2.407 | 1.23E−06 | 1.422 |
| 0.06 | 3.505 | 1.28E−06 | 2.305 | 1.22E−06 | 1.391 |
| 0.07 | 3.595 | 1.26E−06 | 2.266 | 1.21E−06 | 1.390 |
| 0.08 | 3.747 | 1.23E−06 | 2.236 | 1.20E−06 | 1.400 |

TABLE 19 shows that the resistance value changes as the thickness of each of the two conductors $53a$, $53b$ changes in a case where the model has the width and the thickness being different from each other in values, and each of the two conductors $53a$, $53b$ has the different value of the thickness to minimize the resistance value. Then, the relationship of the resistance values with respect to the thickness of each of the two conductors $53a$, $53b$ was determined. The result obtained by the determination of the relationship is illustrated in FIG. 36. The resistance value of the lower side conductor $53b$ being close to the magnetic sheet was greater on the whole than that of the upper side conductor $53a$, the resistance value of the conductor $53a$ was minimized where the conductor $53a$ had the thickness of approximately 42% of the overall thickness formed of the conductors $53a$, $53b$, and the dielectric 52, and the resistance value of the lower side conductor $53b$ was minimized where the conductor $53b$ had the thickness of approximately 30% of the overall thickness formed of the conductors $53a$, $53b$, and the dielectric 52. The following result is obtained: the overall resistance value in a case of the parallel connection is reduced with an increase in the thickness of each of the two conductors $53a$, $53b$; where each of the two conductors $53a$, $53b$ has a thickness of 0.77 mm, that is, where each of the two conductors $53a$, $53b$ has a thickness of approximately 42% of the overall thickness formed of the conductors 53a, 53b, and the dielectric 52, however, the overall resistance value becomes the minimum value (1.390 Ω/m); and where each of the two conductors 53a, 53b has the thickness of greater than or equal to 0.07 mm, the overall resistance value turns into an increase.

In addition, the model was arranged to have a width of 0.3 mm and a thickness of 0.215 mm as the example having a width and a thickness being different from each other in values, the magnetic sheet 54 was disposed with a space of 0.05 mm between the lower surface of the lower side conductor 53b and the magnetic sheet 54, and the simulations were performed by changing the thickness of the two conductors 53a, 53b within a range of 0.215 mm (the thickness of the model) as illustrated in TABLE 20. The dielectric 52 had the dielectric constant of "1."

TABLE 20

| CONDUCTOR THICKNESS [mm] | LOWER SIDE CONDUCTOR | | UPPER SIDE CONDUCTOR | | PARALLEL CONNECTION |
| --- | --- | --- | --- | --- | --- |
| | RESISTANCE [Ω/m] | INDUCTANCE [H/m] | RESISTANCE [Ω/m] | INDUCTANCE [H/m] | RESISTANCE [Ω/m] |
| 0.01 | 7.385 | 1.47E−06 | 6.756 | 1.26E−06 | 3.528 |
| 0.02 | 4.539 | 1.44E−06 | 3.892 | 1.25E−06 | 2.095 |
| 0.03 | 3.824 | 1.42E−06 | 2.965 | 1.24E−06 | 1.670 |
| 0.04 | 3.652 | 1.39E−06 | 2.546 | 1.23E−06 | 1.500 |
| 0.05 | 3.595 | 1.37E−06 | 2.335 | 1.23E−06 | 1.415 |
| 0.06 | 3.551 | 1.34E−06 | 2.219 | 1.22E−06 | 1.366 |
| 0.07 | 3.526 | 1.32E−06 | 2.149 | 1.23E−06 | 1.335 |
| 0.08 | 3.521 | 1.30E−06 | 2.083 | 1.21E−06 | 1.309 |
| 0.09 | 3.603 | 1.27E−06 | 2.060 | 1.20E−06 | 1.311 |
| 0.10 | 3.749 | 1.24E−06 | 2.034 | 1.20E−06 | 1.319 |

TABLE 20 shows that the resistance value changes as the thickness of each of the two conductors 53a, 53b changes in a case where the model has the width and the thickness being different from each other in values, and each of the two conductors 53a, 53b has the different value of the thickness to minimize the resistance value. Then, the relationship of the resistance values with respect to the thickness of each of the two conductors 53a, 53b was determined. The result obtained by the determination of the relationship is illustrated in FIG. 37. The resistance value of the lower side conductor 53b being close to the magnetic sheet was greater on the whole than that of the upper side conductor 53a, the resistance value of the conductor 53a was minimized where the conductor 53a had the thickness of approximately 47% of the overall thickness formed of the conductors 53a, 53b, and the dielectric 52, and the resistance value of the lower side conductor 53b was minimized where the conductor 53b had the thickness of approximately 37% of the overall thickness formed of the conductors 53a, 53b, and the dielectric 52. Accordingly, the following result is obtained: the overall resistance value in a case of the parallel connection is reduced with an increase in the thickness of each of the two conductors 53a, 53b; where each of the two conductors 53a, 53b has a thickness of 0.08 mm, that is, where each of the two conductors 53a, 53b has a thickness of approximately 37% of the overall thickness formed of the conductors 53a, 53b, and the dielectric 52, however, the overall resistance value becomes the minimum value (1.390 Ω/m); and where each of the two conductors 53a, 53b has the thickness of greater than or equal to 0.08 mm, the overall resistance value turns into an increase.

According to the above results, the resistance reduction effect provided by the parallel connection of the antenna conductors divided is found to be deteriorated in the antenna circuit in a case where the magnetic sheet is disposed closer to the antenna conductor, and the resistance reduction effect is found to be close to a state that the magnetic sheet is not disposed in a case where the space between the antenna conductor and the magnetic sheet is large. Particularly, the resistance value is found be minimized in a case where each of the two conductors connected in parallel has the thickness of greater than or equal to 37% and less than or equal to 43% of the overall thickness formed of the antenna conductors and the base material in the antenna circuit. Moreover, a resistance value having no practical disadvantage is found to be obtained in a case where each of the two conductors connected in parallel has the thickness of greater than 5% and less than 50% of the overall thickness formed of the antenna conductors and the base material in the antenna circuit. Since a thickness of an antenna conductor has a limitation in an actual antenna circuit, an increase in a distance between the magnetic sheet and the substrate of the antenna circuit can allow the antenna circuit to be designed to provide a property having no practical disadvantage.

In the antenna circuit 11 and the transponder 10 including the antenna circuit 11 according to the embodiment of the present invention described above, the antenna conductors 13a, 13b connected in parallel are respectively formed on the front and back surfaces of the base material 12, and each of the antenna conductors 13a, 13b has the thickness arranged to be greater than or equal to 5% and less than 50% of the overall thickness formed of the antenna conductors 13a, 13b, and the base material 12, preferably greater than or equal to 35% and less than or equal to 45%, so that the resistance value can be reduced to a suitable value to obtain a desired property while ensuring the inductance in the widely used short-wave band (13/56 MHz).

In the antenna circuit 11 and the transponder 10, moreover, each of the two conductors 13a, 13b has the thickness arranged to be greater than or equal to 5% and less than 50% of the overall thickness formed of the antenna conductors 13a, 13b, and the base material 12, preferably greater than or equal to 37% and less than or equal to 43%, so that that the resistance value can be reduced to a suitable value to obtain a desired property while ensuring the inductance in the widely used short-wave band (13/56 MHz) in a case where the magnetic sheet is disposed.

Such optimization of the thickness of the antenna conductors 13a, 13b is provided as the inventor of the present invention has considered the influence caused by flow of the high frequency current to the antenna conductors 13a, 13b, and has found that the wiring resistance is not simply ½ of the wiring resistance in a case of disposing only one antenna conductor.

The optimization of the thickness of the antenna conductors 13a, 13b has an advantage over the resistance reduction effect provided by the parallel connection of the antenna conductors 13a, 13b in a prior-art manner, and is not simply a matter for the design. Accordingly, the design guide is used to design the transponder, thereby enhancing a property of the transponder having a limitation of flexibility due to a limitation of size.

Moreover, an inexpensive printed wiring board can be used as the base material 12, and the antenna coil is formed as the printed antenna in the antenna circuit 11, so that a process of the antenna circuit 11 can be facilitated. In addition, the antenna circuit 11 can be manufactured using a manufacturing process of the printed wiring board, so that a manufacturing cost as a whole can be significantly reduced.

According to the above embodiments, for example, the thickness of the antenna conductors 13a, 13b is optimized based on the result of the simulations performed by using the models having the two copper-made conductors 53a, 53b corresponding to the antenna conductor 13a, 13b. The present invention, however, can be assumed to obtain the similar result not only in a case where a conductor made of another metal is used, but also in a case where a model having a different size from the above model is used.

According to the above embodiments, the antenna coil is formed as the printed antenna. However, anything functioning as the antenna coil can be applied.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for reducing a resistance comprising:
reducing an electrical resistance of an antenna circuit to be disposed to a transponder, storing various data in a readable and/or writable manner and having a communication function, for a carrier frequency of 13.56 MHz,
wherein the antenna circuit includes:
a prescribed base material that is a printed wiring board; and
two antenna conductors, each of which is formed of a same prescribed conductor pattern forming an antenna coil, formed on respective front and back surfaces of the base material by an electrically parallel connection,
wherein the overall thickness formed of the two antenna conductors and the base material is greater than or equal to 0.1 mm and less than or equal to 1.0 mm,
wherein each of the two antenna conductors has a thickness arranged to be greater than or equal to 5% and less than 50% of an overall thickness formed of the two antenna conductors and the base material.

2. The method for reducing the resistance according to claim 1, wherein each of the two antenna conductors has the thickness arranged to be greater than or equal to 35% and less than or equal to 45% of the overall thickness formed of the two antenna conductors and the base material.

3. The method for reducing the resistance according to claim 1, wherein one of the two antenna conductors has a magnetic sheet disposed on a surface side thereof.

4. The method for reducing the resistance according to claim 3, wherein each of the two antenna conductors has the thickness arranged to be greater than or equal to 37% and less than or equal to 43% of the overall thickness formed of the two antenna conductors and the base material.

5. The method for reducing the resistance according to claim 3, wherein the overall thickness formed of the two antenna conductors and the base material is arranged to be greater than or equal to 0.165 mm and less than or equal to 0.6 mm.

6. The method for reducing the resistance according to claim 3, wherein the magnetic sheet is disposed to one of the two antenna conductors with a space of greater than or equal to 0.1 mm and less than or equal to 0.3 mm therebetween.

7. The method for reducing the resistance according to claim 3, wherein the magnetic sheet has a permeability of 40.

8. The method for reducing the resistance according to claim 1, wherein an overall thickness of the antenna conductors and the base material is greater than or equal to 0.2 mm and less than or equal to 1.0 mm in the antenna circuit, and each of the two antenna conductors has a thickness of greater than or equal to 35% and less than or equal to 37% of the overall thickness of the antenna conductors and the base material.

9. An antenna circuit disposed to a transponder, storing various data in a readable and/or writable manner and having a communication function, for a carrier frequency of 13.56 MHz, the antenna circuit comprising:
a prescribed base material that is a printed wiring board; and
two antenna conductors, each of which is formed of a same prescribed conductor pattern forming an antenna coil, formed on respective front and back surfaces of the base material by an electrically parallel connection,
wherein the overall thickness formed of the two antenna conductors and the base material is greater than or equal to 0.1 mm and less than or equal to 1.0 mm, and
wherein each of the two antenna conductors has a thickness of greater than or equal to 5% and less than 50% of an overall thickness formed of the two antenna conductors and the base material.

10. The antenna circuit according to claim 9, wherein each of the two antenna conductors has the thickness of greater than or equal to 35% and less than or equal to 45% of the overall thickness formed of the two antenna conductors and the base material.

11. The antenna circuit according to claim 9, wherein one of the two antenna conductors has a magnetic sheet disposed on a surface side thereof.

12. The antenna circuit according to claim 11, wherein each of the two antenna conductors has the thickness of greater than or equal to 37% and less than or equal to 43% of the overall thickness formed of the two antenna conductors and the base material.

13. The antenna circuit according to claim 11, wherein the overall thickness formed of the two antenna conductors and the base material is greater than or equal to 0.165 mm and less than or equal to 0.6 mm.

14. The antenna circuit according to claim 11, wherein the magnetic sheet is disposed to one of the two antenna conductors with a space of greater than or equal to 0.1 mm and less than or equal to 0.3 mm therebetween.

15. The antenna circuit according to claim 11, wherein the magnetic sheet has a permeability of 40.

16. The antenna circuit according to claim 9, wherein the base material is formed of a double-side printed wiring board with prescribed conductor foil provided on both surfaces thereof, and
wherein the antenna conductor is formed using the conductor foil provided on a surface of the base material.

17. The antenna circuit according to claim 9, wherein an overall thickness of the antenna conductors and the base material is greater than or equal to 0.2 mm and less than or equal to 1.0 mm in the antenna circuit, and each of the two antenna conductors has a thickness of greater than or equal to 35% and less than or equal to 37% of the overall thickness of the antenna conductors and the base material.

18. A transponder storing various data in a readable and/or writable manner and having a communication function for a carrier frequency of 13.56 MHz, the transponder comprising:
- an antenna circuit including at least an antenna coil formed on a surface of a prescribed base material that is a printed wiring board; and
- an IC chip mounted on the antenna circuit,
- wherein the antenna circuit includes two antenna conductors, each of which is formed of a same prescribed conductor pattern forming the antenna coil, formed on respective front and back surfaces of the base material by an electrically parallel connection,
- wherein the overall thickness formed of the two antenna conductors and the base material is greater than or equal to 0.1 mm and less than or equal to 1.0 mm, and
- wherein each of the two antenna conductors has a thickness of greater than or equal to 5% and less than 50% of an overall thickness formed of the two antenna conductors and the base material.

19. The transponder according to claim 18, wherein an overall thickness of the antenna conductors and the base material is greater than or equal to 0.2 mm and less than or equal to 1.0 mm in the antenna circuit, and each of the two antenna conductors has a thickness of greater than or equal to 35% and less than or equal to 37% of the overall thickness of the antenna conductors and the base material.

* * * * *